US010585769B2

(12) United States Patent
Chen et al.

(10) Patent No.: US 10,585,769 B2
(45) Date of Patent: Mar. 10, 2020

(54) METHOD FOR THE IMPLEMENTATION OF A HIGH PERFORMANCE, HIGH RESILIENCY AND HIGH AVAILABILITY DUAL CONTROLLER STORAGE SYSTEM

(71) Applicant: International Business Machines Corporation, Armonk, NY (US)

(72) Inventors: Lior Chen, Jerusalem (IL); Daniel Gan-Levi, Modiin (IL); Ronen Gazit, Tel-Aviv (IL); Ofer Leneman, Kfar Saba (IL); Deborah A. Messing, Beit Sehemesh (IL)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 15/696,047

(22) Filed: Sep. 5, 2017

(65) Prior Publication Data
US 2019/0073283 A1    Mar. 7, 2019

(51) Int. Cl.
*G06F 11/20* (2006.01)
*G06F 11/14* (2006.01)
*G06F 3/06* (2006.01)

(52) U.S. Cl.
CPC .......... *G06F 11/2089* (2013.01); *G06F 3/067* (2013.01); *G06F 3/0619* (2013.01); *G06F 3/0634* (2013.01); *G06F 11/1435* (2013.01); *G06F 11/1438* (2013.01); *G06F 3/065* (2013.01); *G06F 2201/84* (2013.01)

(58) Field of Classification Search
CPC combination set(s) only.
See application file for complete search history.

(56) References Cited

U.S. PATENT DOCUMENTS

| 6,061,309 | A | * | 5/2000 | Gallo | G11B 17/22 |
| | | | | | 714/13 |
| 6,681,339 | B2 | | 1/2004 | McKean et al. | |
| 6,704,839 | B2 | | 3/2004 | Butterworth et al. | |
| 6,874,100 | B2 | | 3/2005 | Rauscher | |
| 6,928,514 | B2 | | 8/2005 | Chatterjee et al. | |

(Continued)

FOREIGN PATENT DOCUMENTS

| EP | 717358 A1 | 6/1996 |
| GB | 2385690 A | 8/2003 |
| WO | 0114991 A3 | 9/2001 |

*Primary Examiner* — Amine Riad
(74) *Attorney, Agent, or Firm* — Zilka-Kotab, P.C.

(57) ABSTRACT

A computer-implemented method, according to one embodiment, includes: splitting received information between two controllers of a system in a normal operating mode, the received information including data and metadata; storing the metadata in resilient storage in response to a first of the controllers entering a failed state; updating the first controller with information received while the first controller was in the failed state, the first controller being updated in response to the first controller being repaired; and returning the system to the normal operating mode in response to the first controller being updated. Storing the metadata in resilient storage includes: saving snapshots of the metadata in the resilient storage, and saving changes to the metadata which occur between the snapshots. The changes to the metadata are saved in a log structured array. Moreover, the two controllers store the received information in a specified system memory location.

20 Claims, 11 Drawing Sheets

(56) References Cited

U.S. PATENT DOCUMENTS

| | | | |
|---|---|---|---|
| 7,328,324 B2 | 2/2008 | Wang et al. | |
| 7,444,541 B2 | 10/2008 | Lubbers et al. | |
| 8,745,004 B1* | 6/2014 | Natanzon | G06F 11/1469 |
| | | | 707/639 |
| 8,818,951 B1* | 8/2014 | Muntz | G06F 11/1458 |
| | | | 707/639 |
| 9,185,584 B1* | 11/2015 | Ramamurthy | H04W 24/04 |
| 9,753,813 B1* | 9/2017 | Fan | G06F 11/1448 |
| 10,083,093 B1* | 9/2018 | Natanzon | G06F 11/1456 |
| 2013/0111262 A1* | 5/2013 | Taylor | G06F 11/2005 |
| | | | 714/4.11 |
| 2017/0046259 A1* | 2/2017 | McKean | G06F 12/0804 |
| 2019/0155699 A1* | 5/2019 | Luo | G06F 11/1469 |

\* cited by examiner

METHOD FOR THE IMPLEMENTATION OF A HIGH PERFORMANCE, HIGH RESILIENCY AND HIGH AVAILABILITY DUAL CONTROLLER STORAGE SYSTEM

BACKGROUND

The present invention relates to data storage, and more specifically, this invention relates to data storage system for improved dual controller configurations.

Enterprise storage products are typically subjected to an extremely high reliability and data integrity standards. Current industry standards call for a mean time between failures (MTBF) which corresponds to conventional storage products being in uptime between 99.9999% and 99.999% of the time. Another important factor includes how the storage products behave in fatal failure scenarios which the system was not designed to cope with, such as multiple software nodes or concurrent server failures. Conventional enterprise storage products with capacities in the petabyte (PB) range would take days, or even weeks, to recover from back-up following a fatal failure scenario.

Therefore attempts have been made to utilize recovery tools to repair a storage product and avoid recovering from back-ups. However, repairing a storage product using recovery tools is undesirable as well, as doing so typically result in substantial data and metadata loss. Efforts to overcome this loss by continually back-up the data and metadata to persistent storage has severe performance impact on the system, and in most cases is not even a viable option.

Enterprise storage products are also typically expected to provide a customer with a system that is able to achieve high performance, high resiliency and high availability at a low price point relative to the achieved throughput. In order to meet such standards, a dual controller arrangement may be implemented which is able to provide high performance as long as both controllers are functioning. However, when a failure of either one of the controllers occurs, the system is unable to fully maintain its performance by only using the single remaining controller. Accordingly, a common consideration is whether, after the failure of one of the controllers, the system should continue to serve inputs/outputs (I/Os) as the system is performing without redundancy or backup functionality while only one of the controllers is operational.

It follows that conventional products leave the customer with a tough choice of weighing product downtime during recovery with data loss and reduced performance.

SUMMARY

A computer-implemented method, according to one embodiment, includes: splitting received information between two controllers of a system in a normal operating mode, the received information including data and metadata; storing the metadata in resilient storage in response to a first of the controllers entering a failed state; updating the first controller with information received while the first controller was in the failed state, the first controller being updated in response to the first controller being repaired; and returning the system to the normal operating mode in response to the first controller being updated. Storing the metadata in resilient storage includes: saving snapshots of the metadata in the resilient storage, and saving changes to the metadata which occur between the snapshots. The changes to the metadata are saved in a log structured array. Moreover, the two controllers store the received information in a specified system memory location.

A computer program product, according to another embodiment, includes a computer readable storage medium having program instructions embodied therewith. The computer readable storage medium is not a transitory signal per se. Moreover, the program instructions are readable and/or executable by a processor to cause the processor to perform a method which includes: splitting, by the processor, received information between two controllers of a system in a normal operating mode, the received information including data and metadata; storing, by the processor, the metadata in resilient storage in response to a first of the controllers entering a failed state; updating, by the processor, the first controller with information received while the first controller was in the failed state, the first controller being updated in response to the first controller being repaired; and returning, by the processor, the system to the normal operating mode in response to the first controller being updated. Storing the metadata in resilient storage includes: saving, by the processor, snapshots of the metadata in the resilient storage, and saving, by the processor, changes to the metadata which occur between the snapshots. The changes to the metadata are saved in a log structured array. Moreover, the two controllers store the received information in a specified system memory location.

A system, according to yet another embodiment, includes: two controllers; a processor; and logic integrated with the processor, executable by the processor, or integrated with and executable by the processor, the logic being configured to: split, by the processor, received information between the two controllers in a normal operating mode, the received information including data and metadata; store, by the processor, the metadata in resilient storage in response to a first of the controllers entering a failed state; update, by the processor, the first controller with information received while the first controller was in the failed state, the first controller being updated in response to the first controller being repaired; and return, by the processor, the system to the normal operating mode in response to the first controller being updated. Storing the metadata in resilient storage includes: saving, by the processor, snapshots of the metadata in the resilient storage, and saving, by the processor, changes to the metadata which occur between the snapshots. The changes to the metadata are saved in a log structured array. Moreover, the two controllers store the received information in a specified system memory location.

Other aspects and embodiments of the present invention will become apparent from the following detailed description, which, when taken in conjunction with the drawings, illustrate by way of example the principles of the invention.

DETAILED DESCRIPTION

Figure 1:
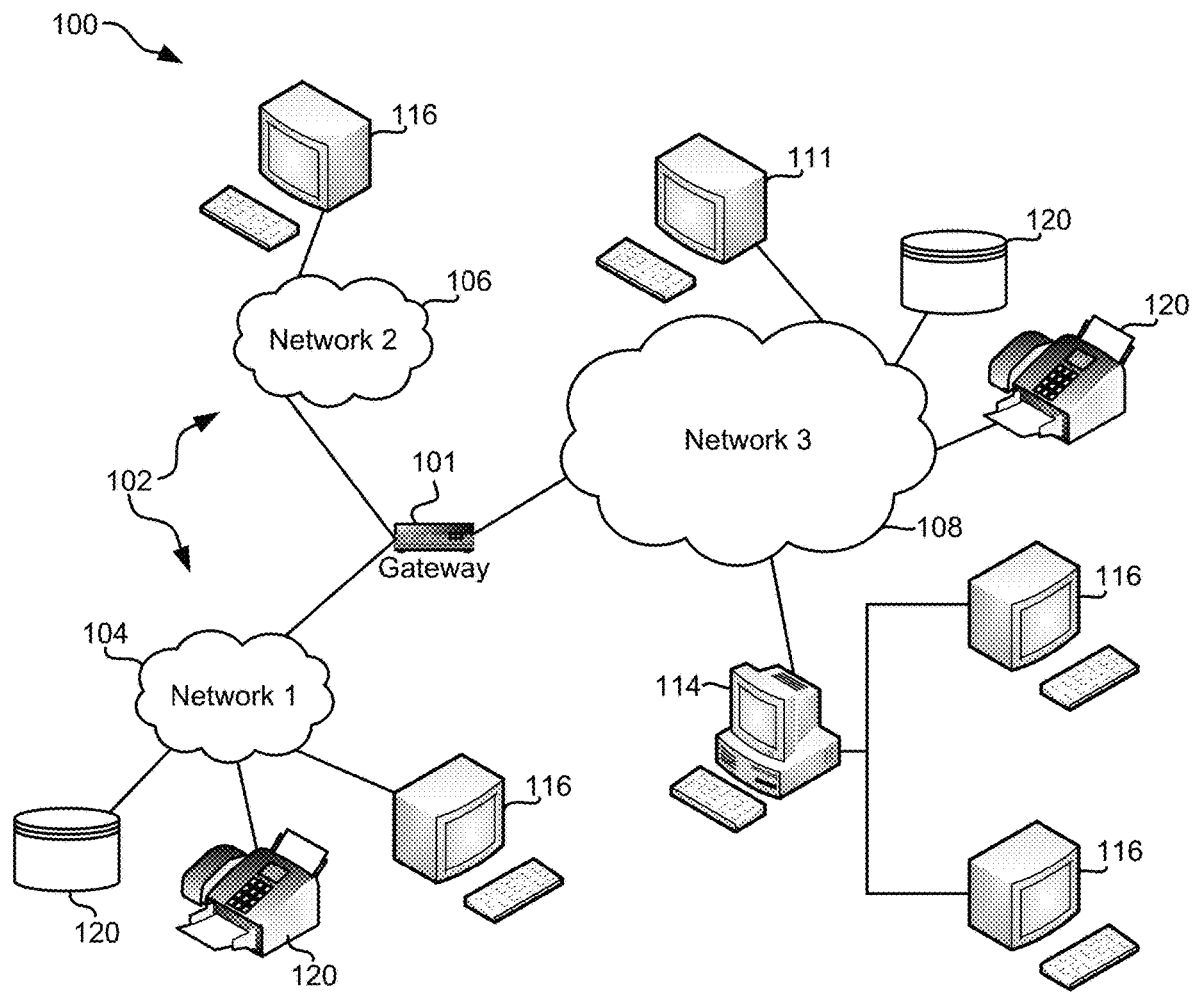
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for managing a dual controller storage system. Some of the embodiments described herein are desirably able to achieve a high performance, high resiliency and high availability dual controller storage system at a low price point relative to the achieved throughput, e.g., as will be described in further detail below.

In one general embodiment, a computer-implemented method includes: splitting received information between two controllers of a system in a normal operating mode, the received information including data and metadata; storing the metadata in resilient storage in response to a first of the controllers entering a failed state; updating the first controller with information received while the first controller was in the failed state, the first controller being updated in response to the first controller being repaired; and returning the system to the normal operating mode in response to the first controller being updated. Storing the metadata in resilient storage includes: saving snapshots of the metadata in the resilient storage, and saving changes to the metadata which occur between the snapshots. The changes to the metadata are saved in a log structured array. Moreover, the two controllers store the received information in a specified system memory location.

In another general embodiment, a computer program product includes a computer readable storage medium having program instructions embodied therewith. The computer readable storage medium is not a transitory signal per se. Moreover, the program instructions are readable and/or executable by a processor to cause the processor to perform a method which includes: splitting, by the processor, received information between two controllers of a system in a normal operating mode, the received information including data and metadata; storing, by the processor, the metadata in resilient storage in response to a first of the controllers entering a failed state; updating, by the processor, the first controller with information received while the first controller was in the failed state, the first controller being updated in response to the first controller being repaired; and returning, by the processor, the system to the normal operating mode in response to the first controller being updated. Storing the metadata in resilient storage includes: saving, by the processor, snapshots of the metadata in the resilient storage, and saving, by the processor, changes to the metadata which occur between the snapshots. The changes to the metadata are saved in a log structured array. Moreover, the two controllers store the received information in a specified system memory location.

In yet another general embodiment, a system includes: two controllers; a processor; and logic integrated with the processor, executable by the processor, or integrated with and executable by the processor, the logic being configured to: split, by the processor, received information between the two controllers in a normal operating mode, the received information including data and metadata; store, by the processor, the metadata in resilient storage in response to a first of the controllers entering a failed state; update, by the processor, the first controller with information received while the first controller was in the failed state, the first controller being updated in response to the first controller being repaired; and return, by the processor, the system to the normal operating mode in response to the first controller being updated. Storing the metadata in resilient storage includes: saving, by the processor, snapshots of the metadata in the resilient storage, and saving, by the processor, changes to the metadata which occur between the snapshots. The changes to the metadata are saved in a log structured array. Moreover, the two controllers store the received information in a specified system memory location.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
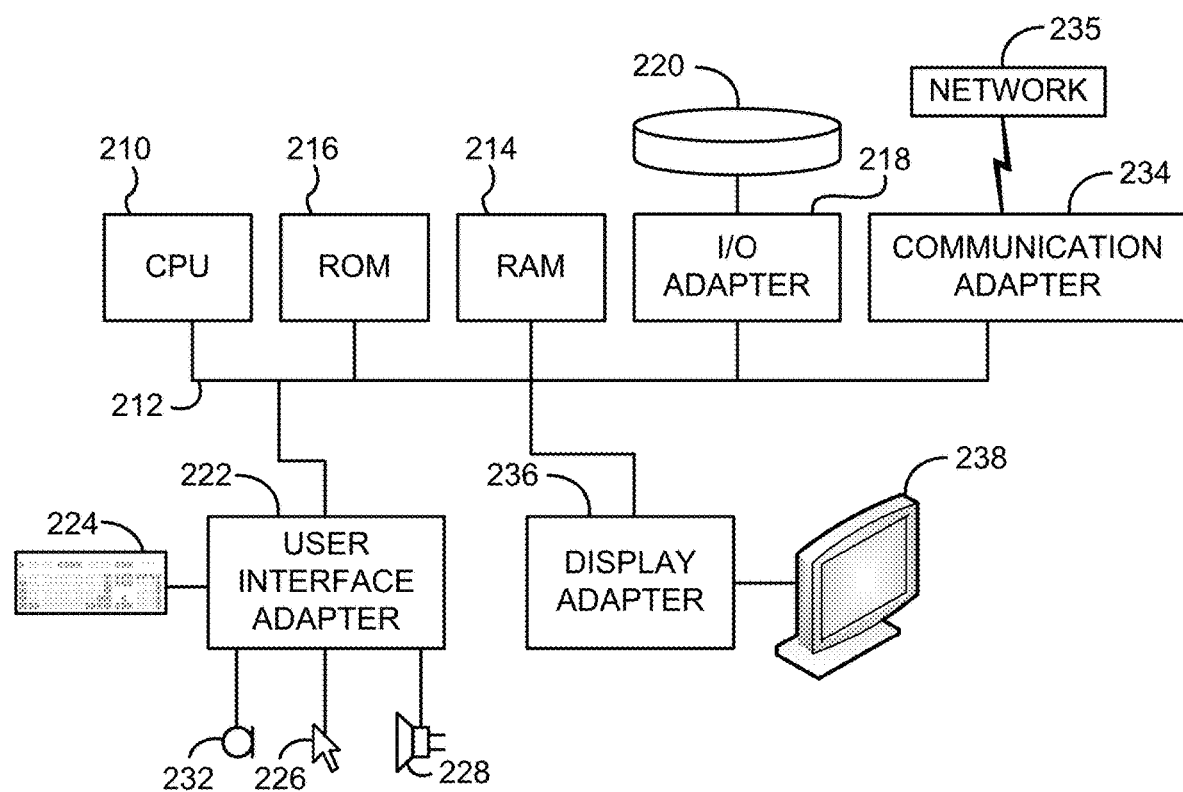
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
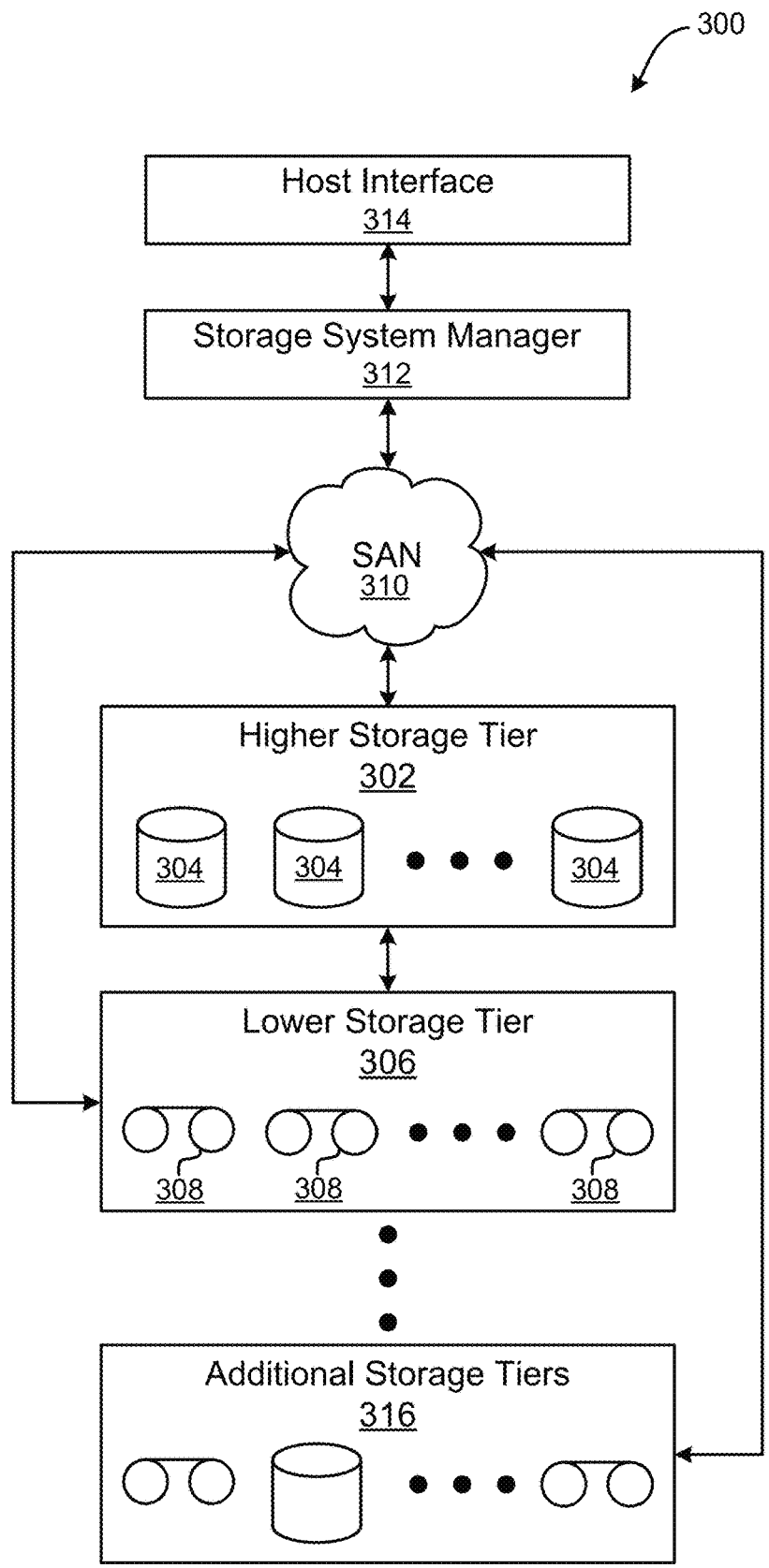
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (compact disc read-only memory (CD-ROM), digital versatile disk read-only memory (DVD-ROM), etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, enterprise storage products are typically expected to provide a customer with a system that is able to achieve high performance, high resiliency and high availability at a low price point relative to the achieved throughput. In order to meet such standards, a dual controller arrangement may be implemented which is able to provide high performance as long as both controllers are functioning. However, when a failure of either one of the controllers occurs, the system is unable to fully maintain its performance by only using the single remaining controller. Accordingly, a common consideration is whether, after the failure of one of the controllers, the system should continue to serve I/Os as the system is performing without redundancy or backup functionality while only one of the controllers is operational.

In response to experiencing a single controller failure, some conventional products perform a total shutdown, thereby undesirably causing availability to suffer, and meeting the industry standards becomes virtually impossible. Other conventional products attempt to operate normally and continue serving I/Os after the first controller fails, but are unable to successfully do so without the assistance of a second controller. Moreover, when the other controller also fails in such conventional products, metadata and write cache is lost, thereby causing user data loss as well as system state instability and/or corruption.

Some conventional products implement three controllers as a minimal configuration of the system, thus being able to maintain a backup for the metadata and data, and only shutting down the system after failure of two of the three controllers. While this scheme is able to meet the desired industry standards of performance, resiliency and availability, it undesirably increases the price point of the product significantly.

In sharp contrast to the foregoing shortcomings experienced by conventional products, various embodiments described herein are able to achieve a high performance, high resiliency and high availability dual controller storage system at a low price point relative to the achieved throughput.

Figure 4:
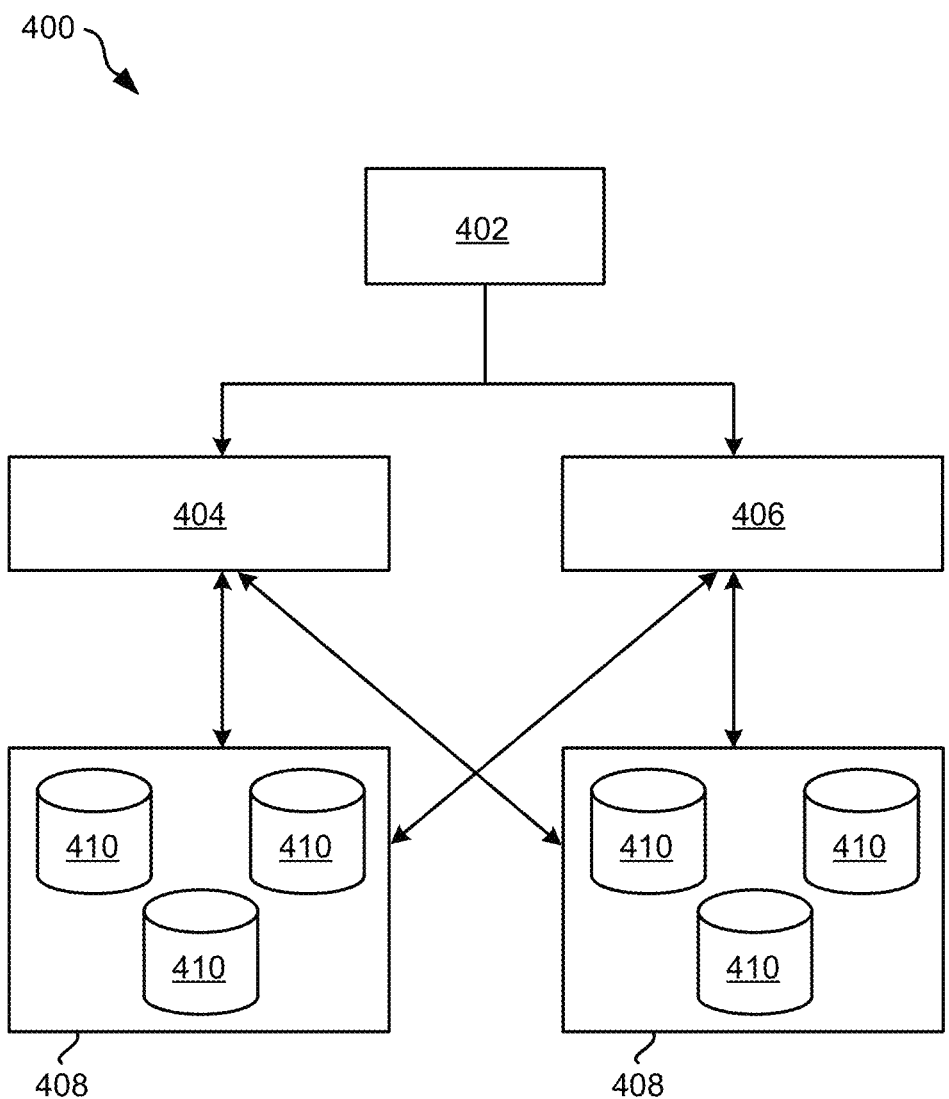
FIG. 4 is a partial representative view of a dual controller storage system in accordance with one embodiment.

Referring to FIG. 4, a partial representational view of a dual controller storage system 400 is illustrated in accordance with one embodiment. As an option, the present storage system 400 may be implemented in conjunction with features from any other embodiment listed herein, such as those described with reference to the other FIGS. However, such storage system 400 and others presented herein may be used in various applications and/or in permutations which may or may not be specifically described in the illustrative embodiments listed herein. Further, the storage system 400 presented herein may be used in any desired environment. Thus FIG. 4 (and the other FIGS.) may be deemed to include any possible permutation.

As shown, the storage system 400 includes two controllers 404, 406 which are both coupled to a load balancer 402. Although not shown, load balancer 402 may receive information (e.g., data and/or metadata) from a host and split the received information into two portions, each of the portions being directed to a respective one of the controllers 404, 406.

Controllers 404, 406 are further coupled to memory modules 408 having storage media 410. According to various approaches, the storage media 410 may include one or more random access and/or direct access media, such as hard disks in hard disk drives (HDDs), nonvolatile memory (NVM), solid state memory in solid state drives (SSDs), flash memory, SSD arrays, RAM, flash memory arrays, etc., and/or others noted herein or known in the art. Moreover, it should be noted that although each of the storage media 410 are numbered the same, any one of the storage media 410 may implement a different type of media, e.g., depending on the desired embodiment.

As information is directed to each of the controllers 404, 406, the controllers may implement any one or more of the processes (e.g., operations, sub-operations, etc.) described herein to manage and/or store the information in the memory modules 408.

While both of the controllers 404, 406 are operational (e.g., healthy), they preferably use each other to backup the metadata and/or data (e.g., in a write cache). As a result, the controllers 404, 406 may be able to provide desirably effective performance, while also ensuring that a single controller failure will not result in data, metadata, or system state loss. Accordingly, the storage system 400 may be able to achieve a high performance, high resiliency and high availability dual controller storage system at a low price point relative to the achieved throughput, e.g., as will be described in further detail below.

Figure 5A:
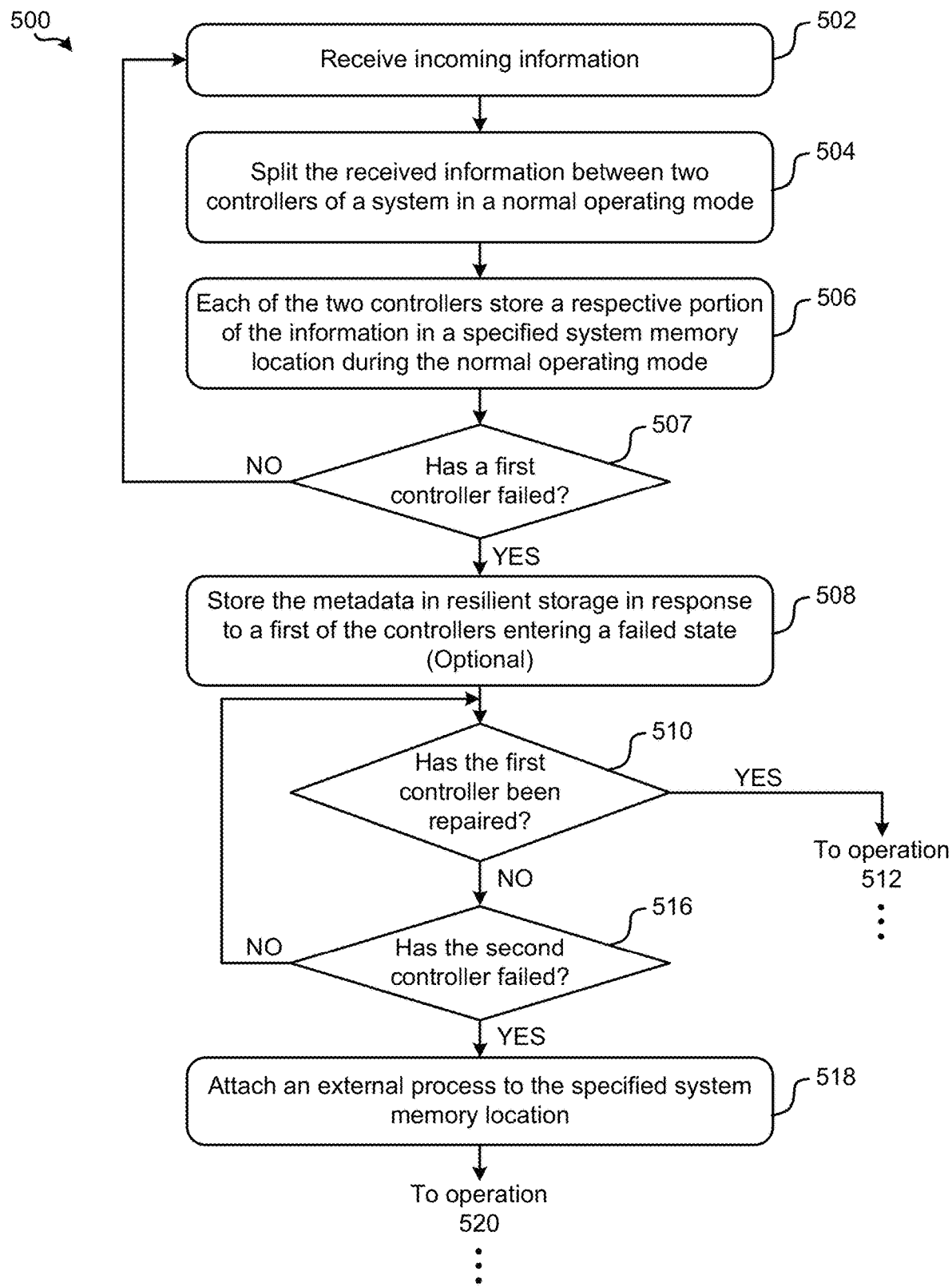
FIG. 5A is a flowchart of a method in accordance with one embodiment.
Figure 5A:
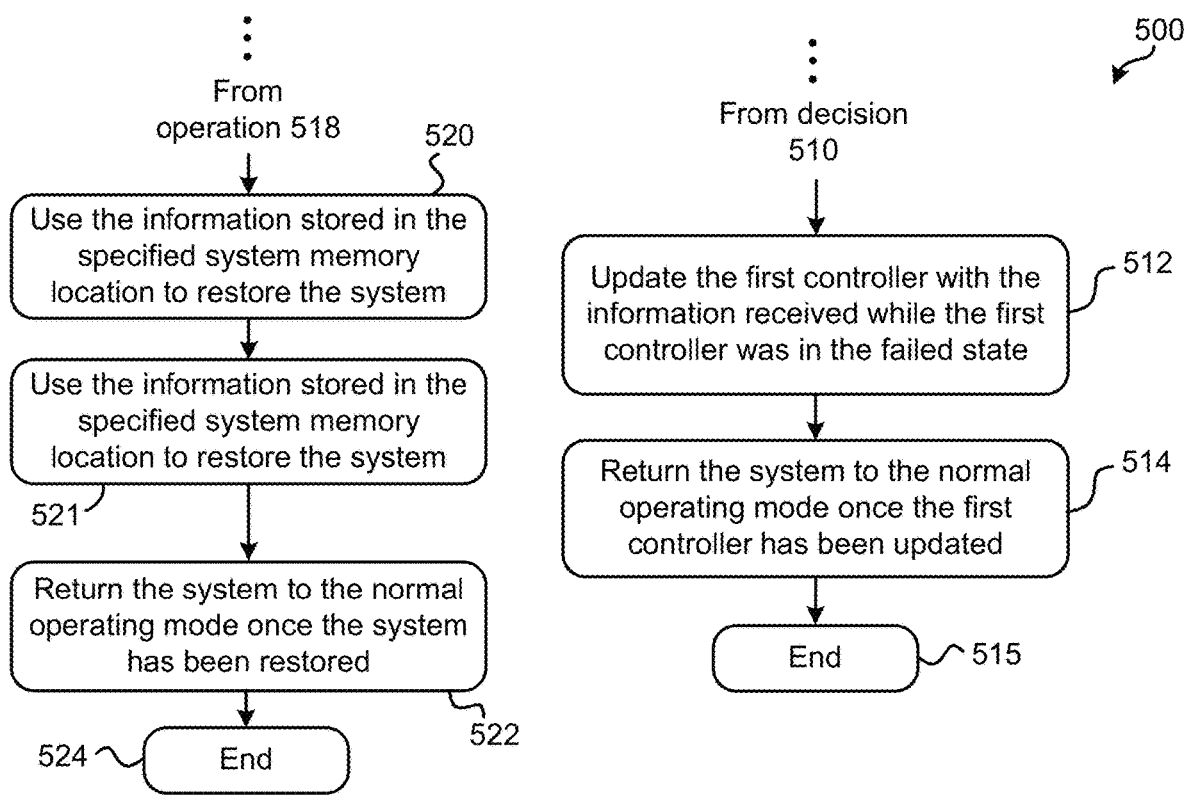

Now referring to FIG. 5A, a flowchart of a computer-implemented method 500 for managing a dual controller storage system, is shown according to one embodiment. According to different approaches, the system may be a data storage system, an operating system configured to run one or more processes, or any other type of system apparent to one skilled in the art after reading the present description. For instance, the system may include any type of application which stores information in RAM. Accordingly, it should be noted that method 500 may be performed by a computing component at (or at least coupled to) the system. Accordingly, the operations included in method 500 are described as being performed at and by the system. However, any one or more of the operations in method 500 may be performed in accordance with the present invention in any of the environments depicted in FIGS. 1-4, among others, in various embodiments. For instance, one or more of the operations included in method 500 may be performed by a processor at a location corresponding to an external process. Of course, more or less operations than those specifically described in FIG. 5A may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a CPU, an application specific integrated circuit (ASIC), a field programmable gate array (FPGA), etc., combinations thereof, or any other suitable computing device known in the art.

As shown in FIG. 5A, operation 502 of method 500 includes receiving incoming information. As data is added to, updated in, removed from, etc. a system, the data itself, as well as metadata which corresponds to the data, are constantly changing. Thus, "information" received by the system may include data and/or metadata (e.g., location information associated with the data), both of which correspond to the system. However, the type of information may vary depending on the type of system. For instance, in different approaches, the information may include data node and/or cache node metadata, write cache, or any other type of information which would be apparent to one skilled in the art after reading the present description.

Moreover, operation 504 includes splitting the received information between two controllers of a system in a normal operating mode. As described above, incoming information may be split between two or more controllers by a load balancer (e.g., see 402 of FIG. 4) of a type known in the art. According to various approaches, the received information may be split differently between the two controllers. For instance, in some approaches the two controllers may be substantially similar, whereby the received information may be split about evenly between the two controllers. In other approaches, the controllers may have different performance characteristics which may be taken into consideration when the information is split between the two, e.g., the controller with the higher performance characteristics may be assigned a greater portion of the received information than the other controller.

Figure 5B:
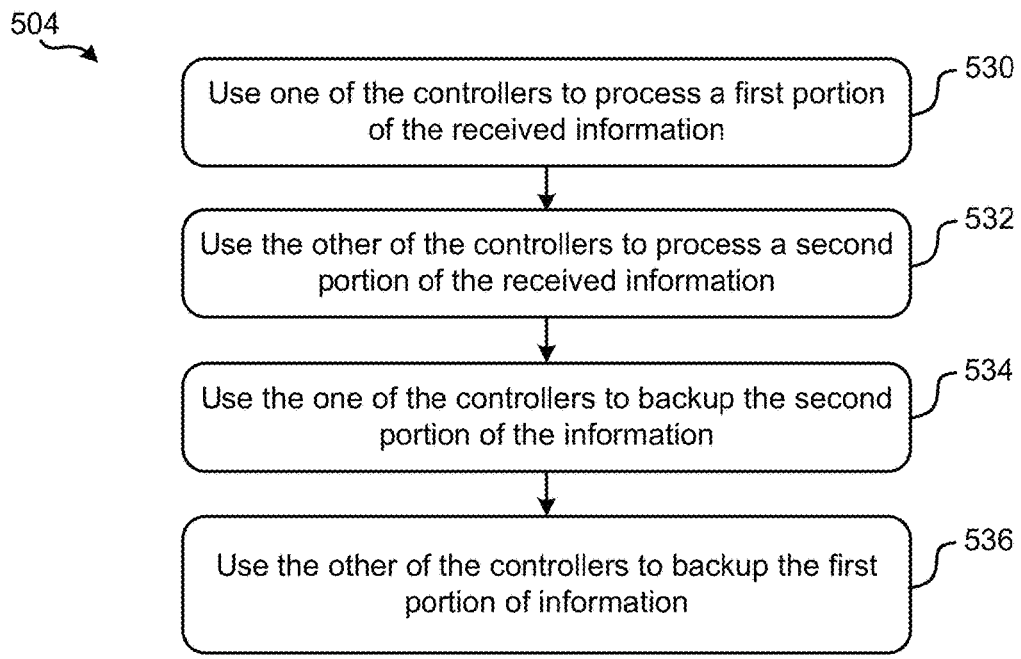
FIG. 5B is a flowchart of sub-processes for performing one of the operations of the method of FIG. 5A.

Referring momentarily to FIG. 5B, exemplary sub-operations of splitting received information between two controllers are illustrated in accordance with one embodiment, one or more of which may be used to perform operation 504 of FIG. 5A. However, it should be noted that the sub-operations of FIG. 5B are illustrated in accordance with one embodiment which is in no way intended to limit the invention.

As shown, sub-operation 530 includes using one of the controllers to process a first portion of the received information, while sub-operation 532 includes using the other of the controllers to process a second portion of the received information. It should be noted that together, the first and second portions of the received information amount to all of the received information. In other words, the received information is split into the first and second portions, e.g., by a load balancer.

Moreover, sub-operation 534 includes using the one of the controllers to backup the second portion of the information, while sub-operation 536 includes using the other of the controllers to backup the first portion of information. The information may be backed up by implementing any backup process and/or procedure which would be apparent to one skilled in the art after reading the present description. For example, one approach of maintaining backups of the data by a controller is to implement high availability. With high availability, the database on the secondary (backup) controller keeps a replicated copy of the data on the primary (other) controller. As a result, each of the controllers is responsible for processing a portion of the received information, while also backing up the remaining portion of the received information. By effectively splitting the load between the controllers, performance of the system is desirably improved. Moreover, information redundancy and/or retention is not sacrificed as all of the received information is also backed up by the controllers. As such, the controllers are able to provide desirably effective performance, while also ensuring that a single controller failure will not result in data, metadata, or system state loss.

Returning to FIG. 5A, after being assigned the information, each of the two controllers store the respective portion of the information in a specified system memory location during the normal operating mode. See operation 506. According to an exemplary approach, the specified system memory location may be in RAM, thus the data included in the information may be cache data which is stored in a write cache in the RAM. Accordingly, the system preferably does not operate in a write-through mode while both controllers are operational and functioning normally. In other words, the system does not write the write cache straight to the media, but rather allows for the write cache to form in the specified system memory location, as the data may be recovered despite the occurrence of a system halt event, e.g., as will be described in further detail below. However, according to various other approaches, the specified system memory location may be in any desired type of memory.

By storing this information (data and/or metadata) in a specified system memory location, an embodiment having shared memory capability may be achieved. According to the present description, "shared memory" refers to memory or a namespace which may be attached to, inspected by, and/or accessed (e.g., used) by two or more different processors at two or more different locations. In some approaches, the processors may be central processing units (CPUs) which are part of an overarching multiprocessor computer system. In other approaches, the shared memory may be accessed by two or more processes which are run by two or more processors. Thus, the shared memory may be a location in the operating system memory which multiple processes are able to virtually map to concurrently. Accordingly, shared memory may allow the same memory to be accessed by more than one processor equipped with the specified system memory location, e.g., as will be described in further detail below.

It is also preferred that the information stored in the specified system memory location is protected. Protecting the information may reduce the risk of developing inconsistencies in the information and therefore increases the value of the information. According to one approach, the information may be protected by preventing updates from being performed on the information in the specified system memory location, thereby avoiding the possibility of the system experiencing a halt even during an update of the information and thereby causing the information to become corrupted. Moreover, accessing the information stored in the specified system memory location is preferably conducted in a transactional manner, e.g., such that processes are not left partially completed, multiple outstanding processes are not queued in a buffer, etc. Furthermore, in some approaches the state of the information may be arranged and managed separately from other parts of the system memory, e.g., to avoid any inconsistencies from arising.

With respect to the present description, a system memory location may be "specified" by being named and/or defined, e.g., by a physical address, logical address, identified confines of a particular region of memory, etc. Thus, in some approaches the specified system memory location may be a specified region in memory as would be appreciated by one skilled in the art after reading the present description. Information defining the specified system memory location may be predefined by a user, a system administrator, random selection, etc., and is preferably stored in memory itself (e.g., in a lookup table). Moreover, information defining the specified system memory location may be shared with other locations, or at least made available, thereby enabling the other locations to access the shared memory location and the information stored therein.

Referring still to FIG. 5A, decision 507 determines whether either of the controllers (e.g., a "first" of the controllers) has entered a failed state. A controller may enter a failed state as a result of a number of different situations. For instance, a controller may enter a failed state as a result of a host-based issue which triggers a failover procedure, a corrupted driver, a power surge, component breakdown, logical errors, etc., or anything else which would be apparent to one skilled in the art after reading the present description. Method 500 is shown as returning to operation 502 in response to determining that neither of the controllers have failed (entered a failed state), whereby additional information may be received, split and stored according to operations 502, 504, 506 as described above because both controllers are operational and functioning according to the normal operating mode. Yet in other approaches, method 500 may simply continue to determine whether either of the controllers have entered a failed state, e.g., in situations where no additional information is being received.

However, once a controller has entered a failed state, the controller cannot operate according to the normal operating mode and the system may adjust accordingly by entering a resilient state. For instance, method 500 is illustrated as proceeding to optional operation 508 in response to determining that a first of the controllers has entered a failed state. Optional operation 508 includes storing the metadata in resilient storage in response to a first of the controllers entering a failed state. According to an exemplary approach, "resilient storage" may include non-volatile memory such as flash memory, HDDs, magnetic tape, optical discs, etc. By storing the metadata in resilient storage, the metadata is effectively protected from being lost should the second of the controllers fail as well and/or a system crash occur. Moreover, the system is able to continue functioning at a high performance without introducing noticeable latency, even with only a single operative controller which is a significant improvement over the shortcomings of conventional products discussed above. It is preferred that the changes to the metadata are saved (e.g., stored) in a log structured array format, e.g., as would be appreciated by one skilled in the art after reading the present description. In other words, updates to the metadata may be stored in the resilient storage in the form of log structured updates. For instance, the metadata updates may be written sequentially to a circular buffer.

Figure 5C:
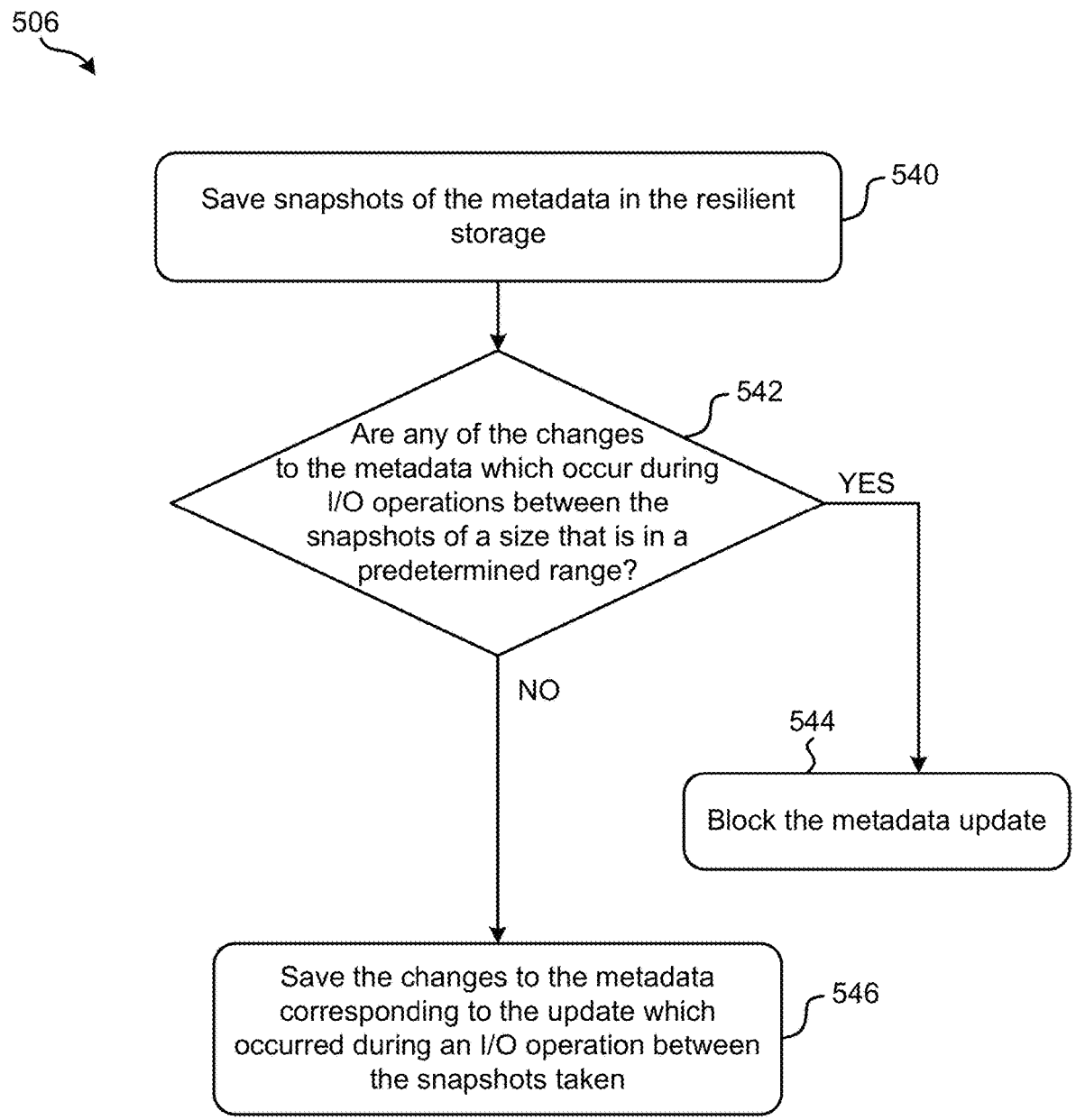
FIG. 5C is a flowchart of sub-processes for performing one of the operations of the method of FIG. 5A.

Referring momentarily now to FIG. 5C, an exemplary sub-processes of storing information in a specified system memory location is illustrated in accordance with one embodiment, one or more of which may be used to perform operation 506 of FIG. 5A. However, it should be noted that the sub-operations of FIG. 5C are illustrated in accordance with one embodiment which is in no way intended to limit the invention.

Here, sub-operation 540 includes saving snapshots of the metadata in the resilient storage. Snapshots allow for point-in-time versions of the metadata to be captured and stored in memory for later use, e.g., during a failure recovery process. Accordingly, snapshots of the metadata are preferably taken periodically (e.g., after a predetermined amount of time has passed), but in different approaches, snapshots may be taken after a certain amount of metadata has been received by the system, upon request by a user, randomly, etc. Each time a snapshot is taken, it may replace the previously stored snapshot, thereby avoiding an inefficient use of the available memory. In preferred approaches, each newly acquired snapshot is stored in a different storage area than the previously acquired snapshot, e.g., such that the newly acquired snapshot may be fully written to memory before the previously acquired snapshot is actually overwritten. Depending on the approach, the "different storage area" may be a different storage location in the same resilient storage as the previously acquired snapshot, a different storage location in a different resilient storage as the previously acquired snapshot, etc. Accordingly, should a system halt event occur while the newly acquired snapshot is in the process of being written to memory, the previously acquired snapshot may be used in combination with stored metadata updates to restore the system to a state the system was in when the system halt event occurred. Once the newly acquired snapshot has been written to memory in full, the previously acquired snapshot may be overwritten. However, in other approaches each snapshot of the metadata may be stored according to any desired memory management architecture, e.g., as would be appreciated by one skilled in the art after reading the present description. For instance, a newly acquired snapshot may be used to directly overwrite a previously stored snapshot.

In order to retain an updated version of the metadata and not lose any changes to the metadata which occur during I/O operations that happen between the snapshots that are taken, it is preferred that such changes to the metadata are also saved in the resilient storage. It follows that metadata updates which correspond to a most recently acquired snapshot of the metadata are preferably retained (e.g., stored in memory). However, during situations when a newly acquired snapshot is being written to memory, metadata updates corresponding to the newly acquired snapshot and/or the previously acquired snapshot (which is preferably still stored in the resilient storage as described above) may be retained. As a result, should a system halt event occur while the newly acquired snapshot is being written to memory, the retained metadata updates may be used in combination with the newly acquired snapshot and/or the previously acquired snapshot to restore the system. Moreover, by storing metadata updates corresponding to the newly acquired snapshot and/or the previously acquired snapshot, I/O latency issues experienced in conventional products are avoided, thereby resulting in improved performance of the system. Moreover, once the newly acquired snapshot has been fully written to memory as mentioned above, metadata updates corresponding to the previously acquired snapshot may be released to be overwritten. In other words, the metadata updates corresponding to the previously acquired snapshot are represented in the newly acquired snapshot. Therefore, once the newly acquired snapshot has been fully written to the resilient memory, the metadata updates corresponding to the previously acquired snapshot become redundant and may therefore be overwritten as desired, e.g., in order to maintain an efficient use of the available memory.

However, it should also be noted that because one of the controllers is in a failed state, the system is somewhat limited in the achievable throughput. Accordingly, it may be desirable to postpone updates to the metadata which call for a significant amount of system resources. Looking to decision 542, it is determined whether any of the changes to the metadata which occur during I/O operations that happen between the snapshots are of a size that is in a predetermined range. In other words, decision 542 determines whether each of the metadata updates are too large to efficiently process while one of the controllers is in a failed state. One example of a metadata update which may be too large to process while one controller is in a failed state includes a snapshot taken of all the volumes included in the storage system. Moreover, it should be noted that "in a predetermined range" is in no way intended to limit the invention. Rather than determining whether a value is in a predetermined range, equivalent determinations may be made, e.g., as to whether a value is above a threshold, whether a value is outside a predetermined range, whether an absolute value is above a threshold, whether a value is below a threshold, etc., depending on the desired approach.

The flowchart proceeds to sub-operation 544 in response to determining that a given metadata update is of a size that is in the predetermined range. In other words, flowchart proceeds to sub-operation 544 in response to determining that a given metadata update is too large to process at the moment (while one of the controllers is in a filed state). There, sub-operation 544 includes blocking the metadata update. According to some approaches, the update may be blocked temporarily (postponed, stalled, etc.), e.g., whereby the update is stored in a queue until both controllers are operational and the system is in a normal operating mode again. In other approaches the update may be blocked by failing the update altogether.

Alternatively, the flowchart proceeds to sub-operation 546 in response to determining that a given metadata update is of a size that is in the predetermined range. There sub-operation 546 includes saving the changes to the metadata corresponding to the update which occurred during an I/O operation between the snapshots taken. As mentioned above, the resilient storage may include different types of memory depending on the given embodiment. However, it is preferred that the changes to the metadata are saved (e.g., stored) in a log structured array format, e.g., as would be appreciated by one skilled in the art after reading the present description. In other words, updates to the metadata may be stored in the resilient storage in the form of log structured updates.

However, it should again be mentioned that the metadata may continue to be stored in the specified system memory location rather than resilient storage. As described above, because the shared memory may allow the same information to be accessed by more than one processor equipped with the specified system memory location, the specified system memory location may be accessed even if the second of the controllers fails and/or a system crash occurs. Thus, although the metadata is preferably stored in the resilient storage while one of the controllers is in a failed state, the data may still be stored in the specified system memory location (e.g., in a write cache therein). Moreover, in some approaches the metadata itself may continue to be stored in the specified system memory location along with the data even after a first controller enters a failed state, e.g., depending on the desired approach.

Although data and/or metadata may continue to be stored in the specified system memory location, the data and/or metadata is not hardened while only one controller is operative. In normal operating mode, data and/or metadata stored by one controller in the specified system memory location is preferably replicated to a physical storage location associated with the other controller for redundancy and data retention purposes. However, data and/or metadata hardening is not performed while only a first controller is functioning, thereby reducing the processing load placed on the system and in view of the fact that the second controller is in a failed state.

FIG. 5 further includes determining whether the first controller has been repaired. See decision 510. Method 500 proceeds to operation 512 in response to determining that the first controller has been repaired, where the first controller is updated with the information received while the first controller was in the failed state. Updating the repaired first controller with the information may be performed by copying the relevant data from the specified system memory location and the relevant metadata from the resilient storage (or specified system memory location depending on the particular approach) to the first controller. Moreover, the system may be returned to the normal operating mode in response to the first controller being successfully (e.g., completely) updated with the information received while the first controller was in the failed state. See operation 514. Accordingly, metadata may be stored in the specified system memory location along with the data, e.g., rather than in the resilient storage.

Subsequently, method 500 may be ended. See operation 515. However, it should be noted that method 500 may progress differently after operation 514 has been performed in other approaches. For instance, method 500 may return to operation 504 after the first controller has been repaired and updated, whereby additional received information may be split and/or assigned to each of the respective controllers. Moreover, additional processes included in FIG. 5 may be repeated.

Returning to decision 510, method 500 proceeds to decision 516 in response to determining that the first controller has not been repaired. There, decision 516 determines whether the second controller has failed in addition to the first controller. Although method 500 is illustrated as returning to decision 510 in response to determining that the second controller has not also entered a failed state, additional steps may be taken. For instance, should additional information be received while the first controller is still in the failed state, the second controller may be used to receive and split the additional information according to any one or more of the processes included in method 500. Thus, the storage system remains online and is able to process incoming information despite having one controller which is in a failed state.

However, method 500 proceeds to operation 518 in response to determining that the second controller has also entered a failed state. There, operation 518 includes attaching an external process to the specified system memory location. When both of the controllers in the dual controller storage system are in a failed state, the system has effectively experienced a halt event, or a system crash. According to the present description, a "halt event" or a "system crash" is a situation which causes the system to enter a failed state during which normal operations such as data reading and/or recording may not be performed. Moreover, the system is unable to save data and/or metadata included in the system memory when in a failed state following a halt event, primarily because the system is without any operational controllers.

Once a system halt even has occurred, the system may remain "offline" or not in a normal operation state until the system has been restored, e.g., by repairing or replacing both of the failed controllers. Moreover, restarting the system may also assist in restoring the system. However, in order to restart the system without incurring data and/or metadata loss, it is preferred that the data and/or metadata stored in the specified system memory location be transferred or copied to a separate memory location. As previously mentioned, the system may store data and/or metadata in RAM which is typically associated with volatile types of memory (e.g., such as Dynamic RAM (DRAM) memory modules) which is effectively erased (stored information is lost) if power to the memory is interrupted. Thus, by attaching an external process, or external script, to the specified system memory location after a system halt event has occurred but before the system is restarted, the external process may access the data and/or metadata stored therein by utilizing the shared memory, e.g., as will be described in further detail below, e.g., with reference to method 600 of FIG. 6.

With continued reference to FIG. 5A, operation 520 further includes using the information stored in the specified system memory location to restore the system to a state the system was in when the second controller entered the failed state (the system halt event occurred). Although the information stored in the specified system memory location may be used differently to restore the system depending on the desired embodiment, an exemplary process of restoring the system is disclosed below with reference to any one or more of the processes in FIGS. 6-7A. It follows that any one or more of the processes included in FIGS. 6-7A may be implemented as a part of performing operation 520, as would be appreciated by one skilled in the art after reading the present description.

Moreover, referring still to FIG. 5A, operation 521 includes recovering the metadata from the resilient storage. As described above, the metadata may be stored in resilient storage in response to a first of the controllers entering a failed state. Thus, the metadata is preferably retrieved from the resilient storage and used to repair the controllers to a state they were in prior to the system halt. According to one approach, the metadata may be copied from the resilient storage to one or both of the repaired controllers and/or memory corresponding thereto (e.g., the specified system memory location). However, it should be noted again that in some approaches metadata may only be stored in the specified system memory location, whereby any one or more of the processes included in FIGS. 6-7A may be implemented to restore the metadata, e.g., as would be appreciated by one skilled in the art after reading the present description.

It is preferred that operations 520 and 521 are performed after (e.g., in response to) the first and/or second controllers have been repaired, thereby desirably enabling the system to successfully resume the normal operating mode once the system has been restored. According to an exemplary approach, which is in no way intended to limit the invention, repairing one or both of the controllers may be achieved by rebooting the contoller(s) in a recovery mode and repairing any of the issues that may have caused the respective controller to initially enter a failed state. Once in recovery mode, preferably both controllers may read a most recently stored snapshot of the metadata from the resilient storage and subsequently read the metadata updates stored after the most recent snapshot was taken. By "reading" the metadata updates stored after the most recent snapshot, the controllers may each play the metadata updates over the snapshot, thereby integrating the two and forming a complete and accurate representation of the metadata up to a point where the system was halted (when the second of the controllers also failed). Thus, the metadata and data write cache may be reinstated for each of the controllers.

Assuming that both of the controllers have been repaired, operation 522 includes returning the system to the normal operating mode in response to the system being restored. Subsequently, method 500 may be ended. See operation 524. However, it should be noted that method 500 may return to operation 502 in some approaches after operation 522 has been performed. For instance, method 500 may return to operation 502 after the system has been restored as well as both controllers having been repaired and updated. As a result, additional information may be received, split and/or assigned to each of the respective controllers, whereby additional processes included in FIG. 5 may be repeated. However, assuming that only one of the controllers is repaired and the second controller remains in a failed state, the system may return to a resilient state, under which optional operation 508 may be re-performed.

It follows that various embodiments described herein are able to achieve a high performance, high resiliency and high availability dual controller storage system at a low price point relative to the achieved throughput, e.g., by implementing any one or more of the processes described herein. Moreover, the external process is able to attach to a specified memory location in the system and extract the information (data and/or metadata) stored in the specified memory location to another storage location which preferably corresponds to the external process. By doing so, the system may be restarted in a recovery mode without losing any of the information from the specified system memory location despite one or even all (e.g., both) the controllers entering a failed state at the same time. Once in a recovery mode, the system may regain access to the information and use it to reform the system to a state it was in at the time the controller failures occurred, thereby desirably avoiding any loss of data and/or metadata from the system as a result of the halt event occurring. In other words, some of the embodiments included herein are able to achieve loss less process state and memory recovery procedures.

However, as previously described, enterprise storage products are also typically subjected to an extremely high reliability and data integrity standards. Yet, conventional storage products are unable to efficiently recover from fatal failure scenarios. For example, enterprise storage products with capacities in the PB range would take days, or even weeks, to recover from a back-up following a fatal failure scenario.

A storage product may suffer from two kinds of fatal failures which include: massive hardware components failures (e.g. massive components suffering from sudden power loss, overheating, etc.), and massive software components and/or node failures.

A software related failure may cause a process to halt. Traditionally, halted processes are considered dead and their online state is lost. This means that in order to resume the process, the storage product either starts over (e.g., refills) from scratch, or from a known point in time that was previously stored in resilient media. Attempts have been made to utilize recovery tools to repair a storage product and avoid recovering from back-ups. However, repairing a storage product using recovery tools is undesirable as well, as doing so typically result in substantial data and metadata loss. Efforts to overcome this loss by continually back-up the data and metadata to resilient storage imposes a severe performance penalty on the system, and in most cases is not even a viable option.

Alternative efforts have been made to back-up the memory and/or process states concurrently on an additional process that will track the state of the main process. The back-up is usually located on another server to provide additional resiliency. Although these efforts do provide additional resiliency, they come at a price to the user. Specifically, the user is taxed with additional processes and resources, communication between processes, delay in operation due to making inter-process updates, etc. Moreover, there is also a very real possibility that whatever caused the original process to halt will also cause the back-up process to halt, thereby essentially making the back-up void in such a scenario.

Further still, some conventional storage products implement a battery in order to reduce the probability of process halt events by allowing the server and the processes to shutdown properly in the event of power loss. Although this scheme may cope with power loss events, it provides no assistance in the event of process halts caused by software failures.

While it may be possible to design the hardware of a storage product such that the correlation of having multiple hardware failures is low (e.g. by installing separate power sources for each server), the nature of some software failures is such that the correlation between the failing software nodes can be high. In other words, the same software failure may trigger rolling node failures. In addition, conventional enterprise storage solutions are often made up of millions of lines of code which increases the probability of a software related failure compared to hardware based failures.

In sharp contrast to the various shortcomings experienced by conventional storage products, some of the embodiments described herein are able to recover a system from a massive software failure without having a user chose between product downtime during recovery and data loss/application inconsistency as experienced with conventional products. In other words, some of the embodiments included herein are able to provide loss-less system recovery processes, e.g., as will be described in further detail below.

Figure 6:
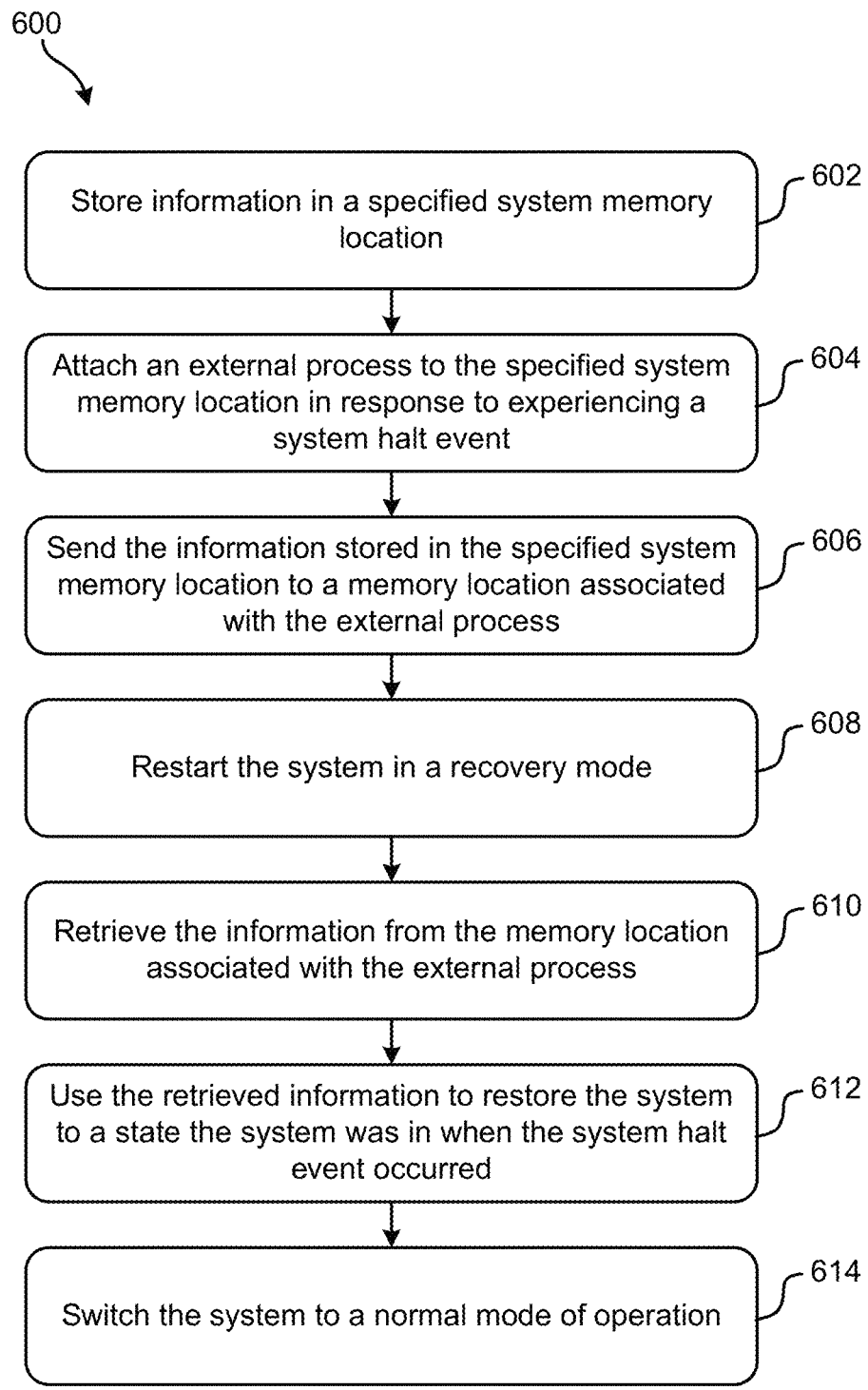
FIG. 6 is a flowchart of a method in accordance with one embodiment.

Now referring to FIG. 6, a flowchart of a computer-implemented method 600 for recovering from a system halt event, is shown according to one embodiment. According to different approaches, the system may be a data storage system, an operating system configured to run one or more processes, or any other type of system apparent to one skilled in the art after reading the present description. For instance, the system may include any type of application which stores information in RAM. Accordingly, it should be noted that method 600 may be performed by a computing component at (or at least coupled to) the system. Accordingly, the operations included in method 600 are described as being performed at and by the system. However, any one or more of the operations in method 600 may be performed in accordance with the present invention in any of the environments depicted in FIGS. 1-5C, among others, in various embodiments. For instance, one or more of the operations included in method 600 may be performed by a processor at a location corresponding to an external process (e.g., see method 800 of FIG. 8A below). Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a CPU, an application specific integrated circuit (ASIC), a field programmable gate array (FPGA), etc., combinations thereof, or any other suitable computing device known in the art.

As shown in FIG. 6, operation 602 of method 600 includes storing information in a specified system memory location. As described above, as certain data is added to, updated in, removed from, etc. a system, the data itself, as well as metadata which corresponds to the data, are constantly changing. Thus, "information" stored in the specified system memory location preferably includes data and/or metadata (e.g., location information associated with the data), both of which correspond to the system. However, the type of information may vary depending on the type of system. For instance, in different approaches, the information may include data node and/or cache node metadata, write cache, or any other type of information which would be apparent to one skilled in the art after reading the present description. Moreover, the specified system memory location may be in RAM, thus the data included in the information may be cache data. However, according to various other approaches, the specified system memory location may be in any desired type of memory.

Again, by storing this data and metadata in a specified system memory location, an embodiment having shared memory capability may be achieved. According to the present description, "shared memory" refers to memory or a namespace which may be attached to, inspected by, and/or accessed (e.g., used) by two or more different processors at two or more different locations. In some approaches, the processors may be central processing units (CPUs) which are part of an overarching multiprocessor computer system. In other approaches, the shared memory may be accessed by two or more processes which are run by two or more processors. Thus, the shared memory may be a location in the operating system memory which multiple processes are able to virtually map to concurrently. Accordingly, shared memory may allow the same memory to be accessed by more than one processor equipped with the specified system memory location, e.g., as will be described in further detail below.

It is also preferred that the information stored in the specified system memory location is protected. Protecting the information may reduce the risk of developing inconsistencies in the information and therefore increases the value of the information. According to one approach, the information may be protected by preventing updates from being performed on the information in the specified system memory location, thereby avoiding the possibility of the system experiencing a halt even during an update of the information and thereby causing the information to become corrupted. Moreover, accessing the information stored in the specified system memory location is preferably conducted in a transactional manner, e.g., such that processes are not left partially completed, multiple outstanding processes are not queued in a buffer, etc. Furthermore, in some approaches the state of the information may be arranged and managed separately from other parts of the system memory, e.g., to avoid any inconsistencies from arising.

With respect to the present description, a system memory location may be "specified" by being named and/or defined, e.g., by a physical address, logical address, identified confines of a particular region of memory, etc. Thus, in some approaches the specified system memory location may be a specified region in memory as would be appreciated by one skilled in the art after reading the present description. Information defining the specified system memory location may be predefined by a user, a system administrator, random selection, etc., and is preferably stored in memory itself (e.g., in a lookup table). Moreover, information defining the specified system memory location may be shared with other locations, or at least made available, thereby enabling the other locations to access the shared memory location and the information stored therein.

Referring still to method 600, operation 604 includes attaching an external process to the specified system memory location in response to experiencing a system halt event. As previously mentioned, a system may experience a halt event which again, causes the system to enter a failed state during which normal operations such as data reading and/or recording may not be performed. Moreover, the system is unable to save data and/or metadata included in the system memory when in a failed state following a halt event. It should also be noted that any one or more of the approaches described in relation to operation 604 may be implemented in order to perform operation 518 above, e.g., depending on the desired embodiment.

Halt events may result from various different situations, but generally are caused by failure situations which the system was not designed to be able to cope with. An exemplary list of system halt events, which is in no way intended to limit the invention, includes situations in which a software program is stuck in an infinite loop, there is at least partial power loss to the system, both controllers of a dual controller storage system fail, a sanity check is failed, a server did not shut down completely, data inconsistency which causes a segmentation fault, assertions caused by defensive programming which may be related to system sanity, etc. Moreover, it is preferred that the system halt event did not negatively affect (e.g., corrupt) the data and/or metadata corresponding to the system, or at least the state of the process. As a result, the data and/or metadata stored in the specified system memory location may be accessed by the external process and preferably used to later restore the system, e.g., as will be described in further detail below.

Once a system halt even has occurred, the system may remain "offline" or not in a normal operation state until the system is restored, e.g., by restarting the system. However, in order to restart the system without incurring data and/or metadata loss, it is preferred that the data and metadata stored in the specified system memory location be transferred or copied to a separate memory location. As alluded to above, systems may store data and/or metadata in RAM which is typically associated with volatile types of memory (e.g., such as Dynamic RAM (DRAM) memory modules) which is effectively erased (stored information is lost) if power to the memory is interrupted. Thus, by attaching an external process, or external script, to the specified system memory location after a system halt event has occurred, the external process may access the data and metadata stored therein by utilizing the shared memory. Moreover, the data and metadata stored in the specified system memory location represents the state of the system at the time the halt even occurred, assuming the halt event did not negatively affect the data and/or metadata, e.g., as a result of a system-wide power outage. By retaining at least a copy of the data and metadata even after the system has been restarted, the system may be restored to a state which corresponds to a point in time when the halt event actually occurred. Therefore, is also preferred that the information is not changed following the halt event and therefore new I/O operations, destage processes, metadata operations, etc. are preferably not implemented while the system is offline. The foregoing achievements are significant improvements over conventional storage products which lose some, if not all, data and metadata in response to a halt event occurring.

An external process may be attached to the specified system memory location if the memory location is defined and/or named, e.g., as would be apparent to one skilled in the art after reading the present description. In other words, the information stored in the specified system memory location may be accessed by more than one process. Once allocated, a specified system memory location may be added to a memory page table of the process attempting to attach thereto, e.g., using a shared-memory attach system call. As a result, a shared memory segment may be a part of the address space of the process, although the actual address of the segment may be different. For instance, the starting address of a shared memory segment in the address space of a first process may be different from the starting address of the shared memory segment in the address space of a second process.

In some approaches, the external process may be attached automatically in response to the system halt even occurring. In other approaches, a request may be sent to a processor implementing the external process, whereby the processor may initiate the attachment of the external process to the specified system memory location. In other words, the process of actually attaching the external process to the specified system memory location may be implemented differently depending on the desired embodiment. According to some approaches, the external process may be a process recovery tool which is connected to a data/cache node memory using the name space of the memory location. The name space may be based on a known identifier for cache descriptors in some instances.

Furthermore, operation 606 of method 600 includes sending the information (data and metadata) stored in the specified system memory location to a memory location associated with the external process. It should be noted that the information sent to the memory location associated with the external process is selected to include the relevant information which may be later used to recover the system. In other words, the information copied aside may be selective and may only include the information relevant to perform a system recovery procedure according to any of the approaches described herein. Thus, in preferred approaches, operation 606 may not include sending all the registers and/or the memory generally contained in a core file.

Again, the external process may be performed by a processor in response to a system halt even occurring. Accordingly, the external process and memory location associated therewith, are preferably removed enough from the system that they are not negatively affected by the system halt event. For example, the external process may be performed by a processor which is geographically separated from the system location, and coupled to the specified system memory location via a wireless network connection.

It follows that the memory location where the data and metadata from the specified system memory location is sent is also preferably removed (e.g., geographically) from the system location. Thus, the data and metadata may be securely retained in the memory location associated with the external process while the system is restarted in order to recover from the system halt event and eventually return to a normal operating mode. However, it should be noted that the memory location associated with the external process is not so removed from the system that a connection cannot be made between the system and the external process and/or the memory location associated therewith. It is desirable that the information may be sent back to the system from the memory location associated with the external process in order to restore the system, e.g., as will be described in further detail below.

Accordingly, once the data and metadata from the system have been transitioned to the memory location associated with the external process, operation 608 includes restarting the system in a recovery mode. In the recovery mode, certain features and/or functions of the system may be deactivated. For example, the system may not be able to receive or perform I/O operations when functioning in recovery mode. However, in some approaches I/O operations may be received and stored in a buffer, e.g., to be performed after the system has been returned to a normal mode of operation. By deactivating certain features and/or functions, the system may be able to recover and return to a state the system was in at the point in time the halt event occurred without being prompted with any other operations. This may prevent the halt event from repeating at the system, e.g., particularly in the case of software-based halt events.

Furthermore, by restarting the system, data and metadata stored in certain types of memory is lost as a result of the supply power being cut during the restart process. For example, data and/or metadata stored in volatile memory such as DRAM, static RAM (SRAM), etc. is lost as a result of interrupting the power supplied to the volatile memory as a part of the restart process. It may therefore be desirable to reconstruct the data and/or metadata previously included in the memory as a result of restarting the system in a recovery mode before performing additional operations.

Accordingly, once the system is in recovery mode, method 600 includes retrieving the information from the memory location associated with the external process. See operation 610. In some approaches, a request for the information (data and/or metadata) may be sent to the memory location associated with the external process. In response to receiving the request, the external process may send the information back to the system via a connection existing therebetween, make the information available (e.g., unlocked) and the system may subsequently extract the information, provide the system with the location where the information is stored, etc. In other approaches, the external process may automatically detect when the system has been restarted in recovery mode and may send the information in response to making such a detection, the external process may simply inform the system that the information is ready for retrieval, etc.

Moreover, once the information has been retrieved by the system from the memory location associated with the external process, operation 612 includes using the retrieved information to restore the system to a state the system was in when the system halt event occurred. In other words, the retrieved information may be used to repopulate the system memory and/or destaged to storage. When the halt event occurs, there is no organized state in which the information is stored. Thus, sending the information to the memory location associated with the external process and using the retrieved information to restore the system are performed differently. The information may be loaded into memory and/or replayed as I/O operations, e.g., as will be described in further detail below.

Once the system has been restored to a memory state the system was in when the halt event occurred, operation 614 includes switching the system to a normal mode of operation. Once in a normal mode of operation, the system may be able to receive and/or perform I/O operations, initiate and/or perform programs, etc., depending on system configurations. As previously mentioned, the system may be a data storage system which is capable of receiving, storing, reading, etc. data. However, in other approaches the system may be an operating system configured to run one or more processes. It follows that any one or more of the operations and sub-processes described herein may be performed on different types of relevant (e.g., compatible) systems, e.g., depending on the desired approach.

Figure 7A:
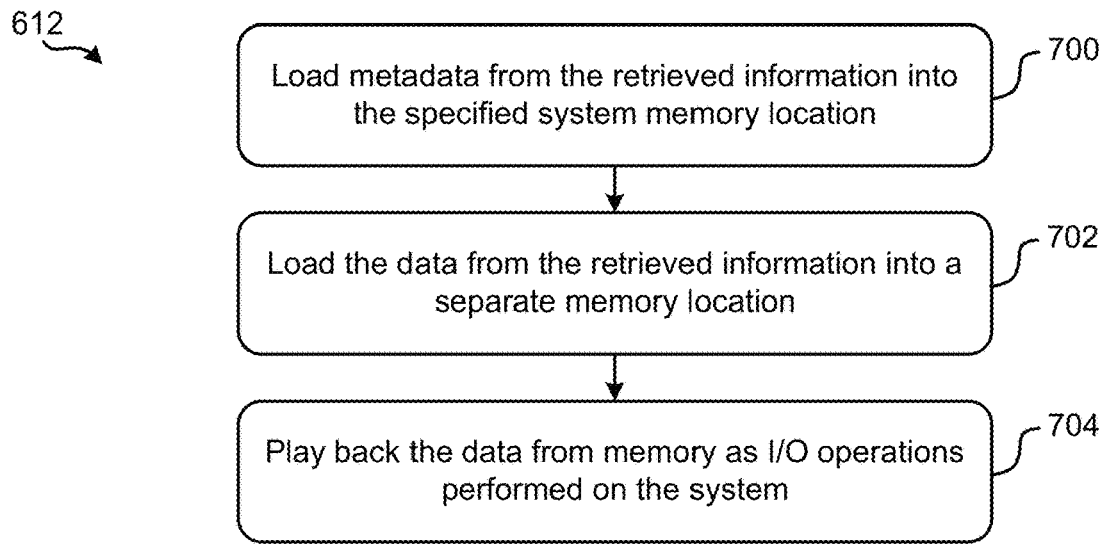
FIG. 7A is a flowchart of sub-processes for performing one of the operations of the method of FIG. 6.

Looking now to FIG. 7A, exemplary sub-processes of using the retrieved information to restore the system are illustrated in accordance with one embodiment, one or more of which may be used to perform operation 612 of FIG. 6. However, it should be noted that the sub-processes of FIG. 7A are illustrated in accordance with one embodiment which is in no way intended to limit the invention.

As mentioned above, the information retrieved from the external process may include data as well as metadata which corresponds to the data. Accordingly, sub-operation 700 includes loading metadata from the retrieved information into the specified system memory location. The same specified system memory location used prior to the halt event may be reused to store the metadata, but in some approaches a different system memory location may be specified (e.g., defined and named) as a result of experiencing the halt event. The metadata may be loaded into the specified system memory location by transferring the metadata files to the memory location as would be appreciated by one skilled in the art after reading the present description. Moreover, upon loading the metadata into the specified system memory location, the metadata state of the process may be recovered. In some approaches, the metadata state of the process may be recovered by implementing a recovery function which allows the system to read and/or implement the information such that the system returns to the state it was in just as the halt event occurred, e.g., as would be appreciated by one skilled in the art after reading the present description.

Referring still to FIG. 7A, sub-operation 702 includes loading the data from the retrieved information into a separate memory location, while sub-operation 704 includes playing back the data from the separate memory location as I/O operations performed on the system. According to one approach, the separate memory location may be located in RAM, but may be located in any type of memory depending on the desired approach. By playing back the data as I/O operations performed on the system, the data may be used to repopulate the specified system memory location and thereby return the system to a state the system was in when the halt event occurred. According to an exemplary approach, which is in no way intended to limit the invention, information stored in one or more files at the memory location associated with the external process may be played back by running a remote procedure call in a node that receives the name(s) of the one or more files. Information may thereby be read from the one or more files and internally handled by the system as a standard I/O operation.

As previously mentioned, these achievements are significant improvements over conventional products which lose all data and metadata changes since a last snapshot of the system memory was taken, or lose the data and metadata altogether as a result of the halt event. Accordingly, various embodiments described herein are able to significantly improve the process of recovering from a system halt event.

In some situations, the data and/or metadata stored in the specified system memory location may be corrupted, e.g., as a result of the system halt event. Thus, inconsistencies may form in the data and/or metadata before it is sent to the memory location associated with the external process in response to the system halt event occurring. It follows that it may be desirable to examine the data and/or metadata before it is reimplemented in the storage system after the system has been restarted in recovery mode. Examining the data and/or metadata may prevent any inconsistencies from being transferred back to the system after the system has been restarted and restored (e.g., see operation 612 above).

According to some approaches the data and/or metadata may be examined at the storage system. For instance, the information may be examined while it is stored in the separate memory location and before it is used to restore the system. In other approaches, the information may be examined as it is received from the memory location associated with the external process and before it is stored in the separate memory location. Accordingly, looking now to FIG. 7B, exemplary sub-processes of retrieving the information from the memory location associated with the external process are illustrated in accordance with one embodiment, one or more of which may be used to perform operation 610 of FIG. 6. However, it should be noted that the sub-processes of FIG. 7B are illustrated in accordance with one embodiment which is in no way intended to limit the invention.

Decision 750 includes determining whether any inconsistencies exist in the retrieved information. In some approaches, inconsistencies in the retrieved information may correspond to whether the information is in-tact after the halt event occurred. In other words, the manner in which the halt event caused the system to stop may have an effect on whether inconsistencies exist in the retrieved information. This determination may be made at any point after a halt event occurs. However, it is preferred that decision 750 is performed after the information has been returned to the system. According to one approach, decision 750 may be performed as a part of a recovery process which loops between descriptors which include data concerning which partition, disk, block, etc. of memory the retrieved information has been stored in the system. Moreover, for each descriptor, the integrity of the corresponding information may be checked in order to determine whether any inconsistencies exist.

Figure 7B:
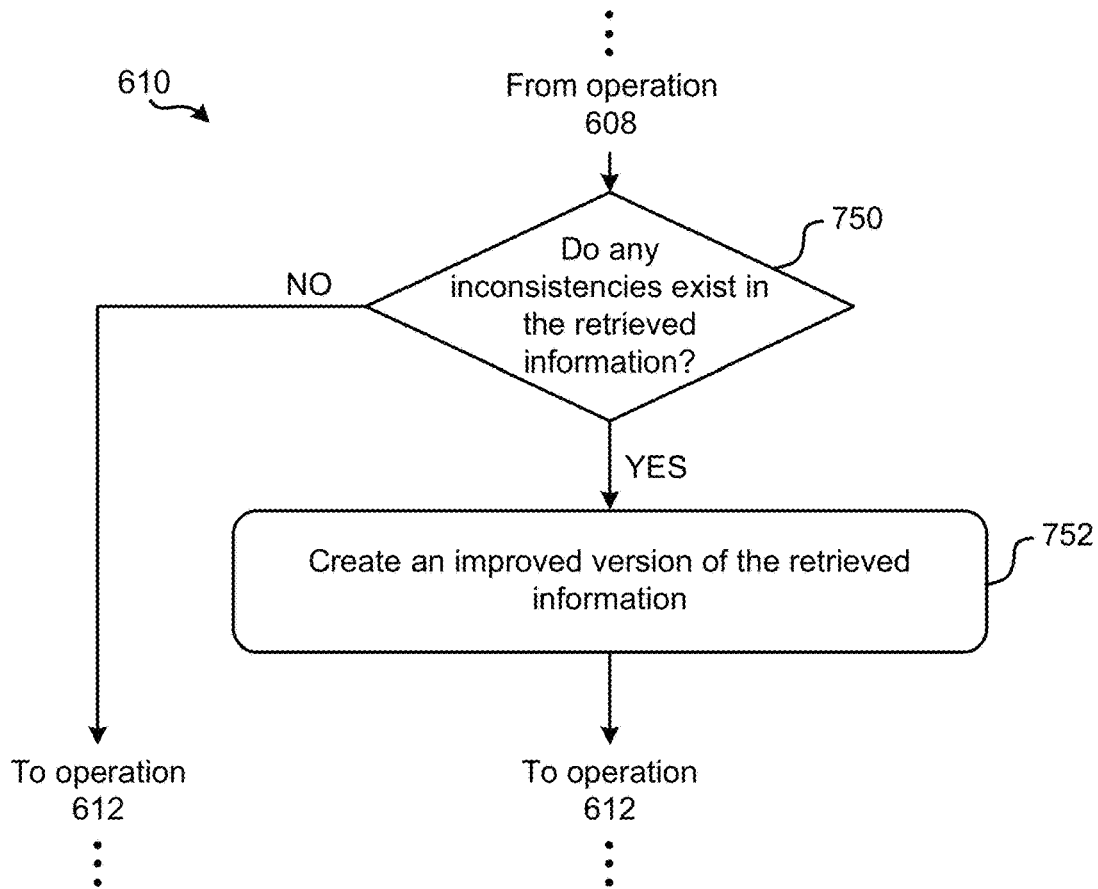
FIG. 7B is a flowchart of sub-processes for performing one of the operations of the method of FIG. 6.

As shown, the flowchart of FIG. 7B returns to operation 612 in response to determining that no inconsistencies exist in the retrieved information. Accordingly, the data and metadata included in the information retrieved from the memory location associated with the external process may be used to reconstruct the system as described above.

Alternatively, FIG. 7B proceeds to sub-operation 752 in response to determining that at least one inconsistency does exist in the retrieved information. There, sub-operation 752 includes creating an improved version of the retrieved information. An improved version of the retrieved information may be created by first analyzing the information. According to some approaches, the information may be analyzed by determining the integrity of the information. In other approaches, the information may be analyzed by comparing it to anticipated values, checking if the information complies with standards associated with the system, determining whether an overall size (amount of memory) of the information matches a size of the information prior to the halt event occurring, etc.

After it is created, the improved version of the retrieved information is preferably used to restore the system rather than the version of the information retrieved directly from the memory location associated with the external process. By doing so, any inconsistencies in the information are not retained after transitioning the information back to the specified system memory location. Thus, although FIG. 7B shows the flowchart proceeding to operation 612 after sub-operation 752 has been performed, it should be noted that the improved version of the retrieved information is preferably used moving forward in operations 612 and 614 when applicable. In other words, the "retrieved information" used to restore the system in operation 612 may include the information retrieved directly from the memory location associated with the external process, or the improved version of the retrieved information, e.g., depending on whether inconsistencies are determined to be in the information.

Although it may be desirable in some approaches that the data and/or metadata is examined at the system, e.g., after it has been received from the memory location associated with the external process, it should be noted that the information may be examined for inconsistencies differently according to various other approaches. For instance, in some approaches, the data and/or metadata may be examined at the memory location associated with the external process prior to being returned to the specified system memory location, e.g., as will be described in further detail below.

As mentioned above, the operations and/or sub-processes included herein may be performed in accordance with the present invention in any of the environments depicted in FIGS. 1-7B, among others, in various embodiments. Thus, looking now to FIG. 8A, a flowchart of a computer-implemented method 800 for helping recover a system from a halt event, is shown according to one embodiment. According to different approaches, the system may be a data storage system, an operating system configured to run one or more processes, or any other type of system apparent to one skilled in the art after reading the present description. For instance, the system may include any type of application which stores information in RAM. However, it should be noted that method 800 is preferably performed by a computing component at (or at least coupled to) a location corresponding to the external process. Accordingly, the operations included in method 800 are described as being performed at the location corresponding to the external process. Moreover, it should be noted that more or less operations than those specifically described in FIG. 8A may be included in method 800, as would be understood by one of skill in the art upon reading the present descriptions.

Each of the steps of the method 800 may be performed by any suitable component of the operating environment. For example, in various embodiments, the method 800 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a CPU, an application specific integrated circuit (ASIC), a field programmable gate array (FPGA), etc., combinations thereof, or any other suitable computing device known in the art.

Figure 8A:
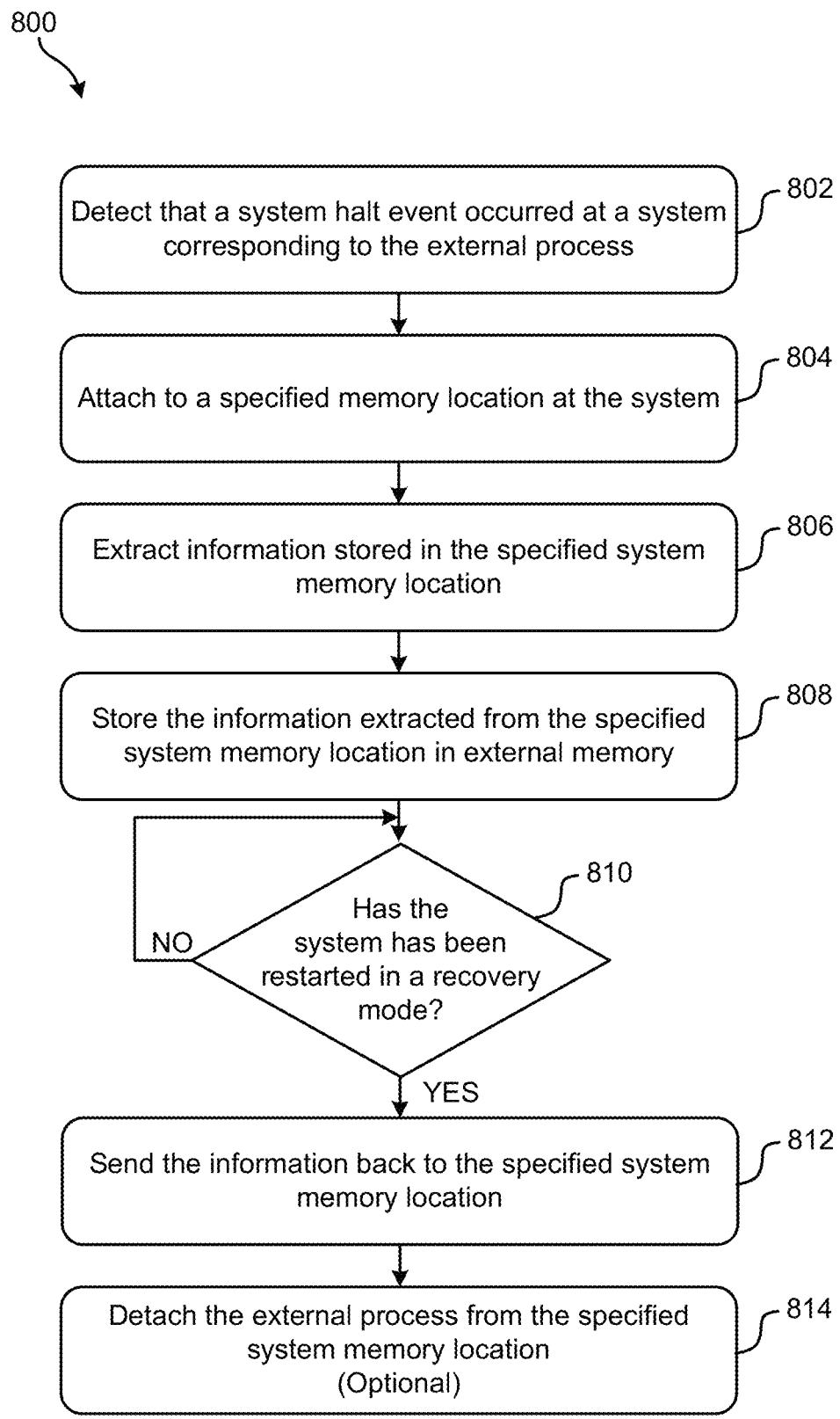
FIG. 8A is a flowchart of a method in accordance with one embodiment.

As shown in FIG. 8A, operation 802 of method 800 includes detecting that a system halt event occurred at a system corresponding to the external process. Moreover, in response to making such a detection, operation 804 includes attaching to a specified memory location at the system. As described above, a system memory location may be specified by being named and/or defined, e.g., by a physical address, logical address, identified confines of a particular region of memory, etc. Thus, in some approaches the specified system memory location may be a specified region in memory as would be appreciated by one skilled in the art after reading the present description. Information defining the specified system memory location may be predefined by a user, a system administrator, random selection, etc., and is preferably stored in memory itself (e.g., in a lookup table). Moreover, information defining the specified system memory location may be shared with other locations, or at least made available, thereby enabling the other locations to access the shared memory location and the information stored therein. Accordingly, the external process may attach (or be attached) to the specified system memory location by using the information defining the memory location's name, location, memory type, etc., despite the external process being external to (e.g., physically removed from) the system.

In some approaches, the external process may attach to the specified system memory location via a wireless connection such as a wireless Internet connection, a wide area network (WAN), a Broadband Global Area Network (BGAN), a LAN, etc. In other approaches, the external process may attach to the specified system memory location via a wired network connection such as an Ethernet connection, a fiber-optic connection, etc.

With continued reference to method 800, operation 806 includes extracting information stored in the specified system memory location. As described above, "information" may at least include data and/or metadata (e.g., location information associated with the data), both of which correspond to the system. According to one approach, the external process may extract the information by reading the information and creating a copy of the information, whereby the copy of the information may be further used by the external process. Moreover, the information may remain in the specified system memory location after it has been extracted by the external process in some approaches. However, in other approaches the external process may delete the information from the specified system memory location after it has been extracted, the system itself may delete the information after it has been extracted, the information may be indicated as invalid to be overwritten during a next garbage collection operation, etc.

Moreover, operation 808 includes storing the information extracted from the specified system memory location in local memory. It should be noted that the term "local memory" is preferably with respect to the external process itself rather than the system. Thus, in different approaches, the extracted information may be stored in different mediums associated with (and preferably accessible by) the external process, which may include magnetic disk, a solid state drive, one or more file locations, etc. As described above, the local memory is preferably removed enough from the system that it is not at risk of being affected by system halt events, but is preferably close enough (geographically and/or logically) to the system that establishing a connection therebetween is likely. Storing the data and/or metadata in the local memory may be achieved by writing the information according to the memory format. For example, information stored in local SSD memory may be sent to a buffer in a SSD controller. According to another example, storing information on a magnetic disk may include implementing a disk_dd command or any other disk write utility which would be apparent to one skilled in the art after reading the present description.

Decision 810 includes determining whether the system has been restarted in a recovery mode. As described above, a system is preferably restarted in a recovery mode after a halt event occurs, e.g., in order to reconstruct the system, but preferably not until after any desired data is transitioned to a secure memory location. For instance, data stored in volatile memory may be lost as a result of restarting the system, as doing so may terminate the power supplied to the memory at least momentarily. Whether the system has been restarted in a recovery mode may be determined in a number of different ways. For example, in some approaches, the external process may detect that the system has been restarted in a recovery mode as a result of receiving a request from the system for the information. Thus, it should be noted that method 800 may alternatively wait to receive a request from the system for the data/metadata, and then send the information in response to receiving the request. In other approaches, the external process may determine that the system has been restarted in recovery mode as a result of the system attempting to reconnect to the external process via a wired and/or wireless connection during a reboot process of the system, or any other way of making such a determination as would be apparent to one skilled in the art after reading the present description.

As shown, method 800 includes sending the information back to the specified system memory location in response to determining (e.g., detecting) that the system has been restarted in a recovery mode. See operation 812. Again, once the system has been restarted in a recovery mode, the data and/or metadata previously included therein may be used to restore the system to a state the system was in at the point in time the halt event occurred, e.g., according to any of the approaches described above. In other approaches, the information may be sent to one or more files and/or memory location the system accesses in response to being restarted in a recovery mode, and the system itself may reimplement the information in the specified memory location from the one or more files and/or memory location. Moreover, after all of the information has been sent back to the system, method 800 may include detaching the external process from the specified system memory location. See optional operation 814. It should also be noted that although operation 812 includes sending the information back to the system, in other embodiments the system may initiate the transfer of and/or effectively pull the information from the memory associated with the external process.

However, returning to decision 810, method 800 continues to loop back and perform decision 810 in response to each time it is determined that the system has not been restarted in a recovery mode. It may be undesirable to send the information back to the system before it has been restarted in a recovery mode as doing so may cause the information to be lost once the system is restarted. For instance, in some approaches the specified system memory location may be in RAM. According to different approaches, method 800 may wait a predetermined amount of time, until a user input is received, until a condition has been met, etc., before decision 810 is performed again after it is determined that the system has not been restarted in a recovery mode. As a result, method 800 may avoid unnecessary resource consumption which may otherwise result from performing decision 810 at too high of a frequency.

Again, in some approaches it may be desirable that the information is examined for inconsistencies at the memory location associated with the external process (e.g., by the external process) before being stored and/or returned to the specified system memory location. Looking to FIG. 8B, exemplary sub-processes of extracting information stored in the specified system memory location are illustrated in accordance with one embodiment, one or more of which may be used to perform operation 806 of FIG. 8A. However, it should be noted that the sub-processes of FIG. 8B are illustrated in accordance with one embodiment which is in no way intended to limit the invention.

Decision 850 includes determining whether any inconsistencies exist in the extracted information. In some approaches, inconsistencies in the retrieved information may correspond to whether the information is in-tact after the halt event occurred. In other words, the manner in which the halt event caused the system to stop may have an effect on whether inconsistencies exist in the retrieved information. This determination may be made at any point during and/or after the information has been extracted from the specified system memory location by the external process following a halt event. According to one approach, decision 850 may be performed as a part of a recovery process which loops between descriptors which include data concerning which partition, disk, block, etc. of memory associated with the external process the extracted information has been stored in. Moreover, for each descriptor, the integrity of the corresponding information may be checked in order to determine whether any inconsistencies exist.

Figure 8B:
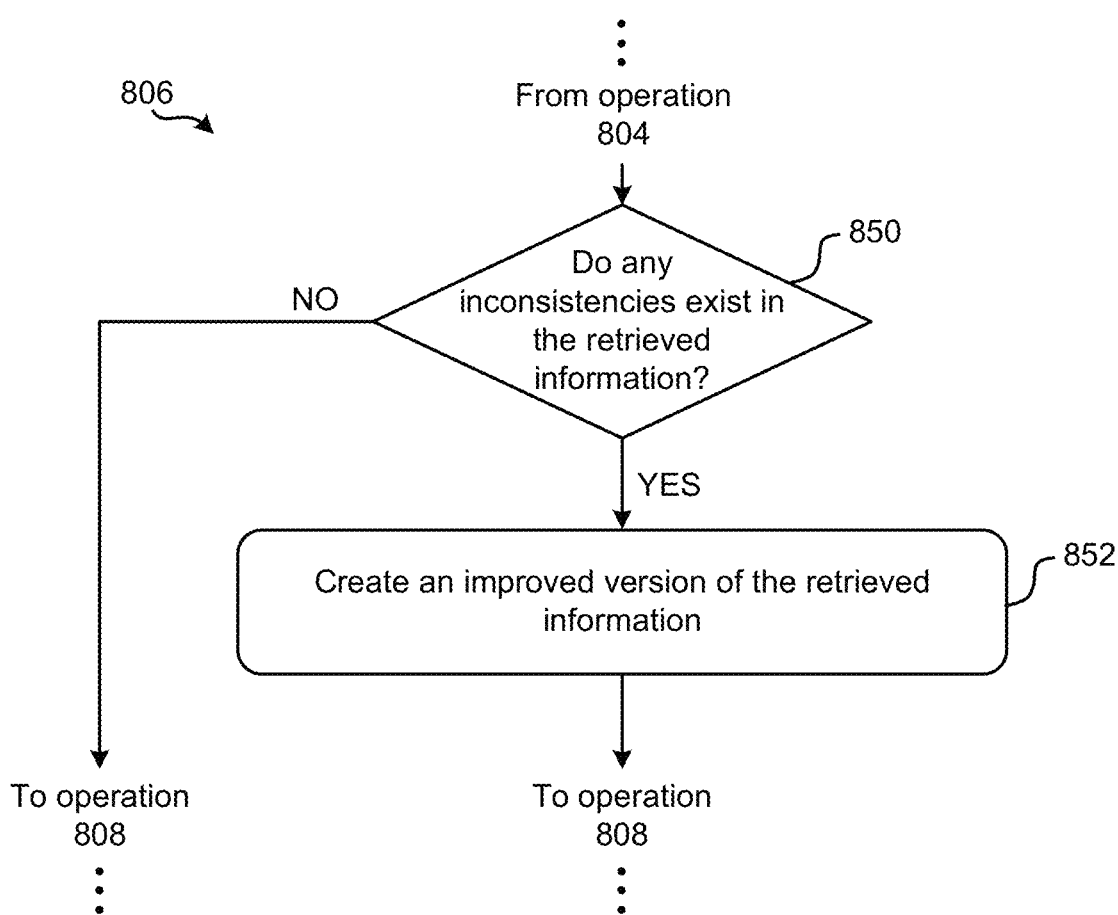
FIG. 8B is a flowchart of sub-processes for performing one of the operations of the method of FIG. 8A.

As shown, the flowchart of FIG. 8B returns to operation 808 in response to determining that no inconsistencies exist in the extracted information. Accordingly, the data and metadata included in the information extracted from the specified system memory location may be stored in a memory location associated with the external process, and may later be used to reconstruct the system according to any of the approaches described herein.

Alternatively, FIG. 8B proceeds to sub-operation 852 in response to determining that at least one inconsistency does exist in the extracted information. There, sub-operation 852 includes creating an improved version of the extracted information. An improved version of the extracted information may be created by first analyzing the information. According to different approaches, the information may be analyzed by determining the integrity of the information, comparing it to anticipated values, checking if the information complies with standards associated with the system, determining whether an overall size (amount of memory) of the information matches a size of the information prior to the halt event occurring, etc.

After it is created, the improved version of the extracted information is preferably stored in the memory location associated with the external process rather than the version of the information directly extracted from the specified system memory location. By doing so, any inconsistencies in the information are not retained after the information is extracted and/or transitioned back to the specified system memory location during a recovery process. Thus, although FIG. 8B shows the flowchart proceeding to operation 808 after sub-operation 852 has been performed, it should be noted that the improved version of the retrieved information is preferably used moving forward in method 800 when applicable. In other words, the "information" sent back to the specified system memory location in operation 812 may include the information extracted directly from the specified system memory location, or the improved version of the extracted information, e.g., depending on whether inconsistencies are determined to be in the information during the extraction process.

It follows that various embodiments described herein are able to recover a system following a halt event, e.g., by attaching to the halted system using an external process. Moreover, the external process is able to attach to a specified memory location in the system and extract the information (data and/or metadata) stored in the specified memory location to another storage location which preferably corresponds to the external process. By doing so, the system may be restarted in a recovery mode without losing any of the information from the specified system memory location. Once in a recovery mode, the system may regain access to the information and use it to reform the system to a state it was in at the time the halt event occurred, thereby desirably avoiding any loss of data and/or metadata from the system as a result of a halt event occurring. In other words, some of the embodiments included herein are able to achieve loss less process state and memory recovery procedures.

Any one or more of the embodiments described herein may be performed on each halted (failed) data/cache node, preferably in order to ultimately recover the entire system to a state the system was in just as the halt event occurred. Moreover, the operations and/or sub-processes included herein may be initiated by an individual (e.g., a system administrator, a user, etc.) in response to detecting that a halt event has occurred at the system, or initiated automatically (e.g., by the system, the external process, a system management controller, etc.) in response to a halt event occurring.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
splitting received information between two controllers of a system in a normal operating mode, wherein the received information includes data, wherein the two controllers store the received information in a specified system memory location, each controller storing metadata corresponding to the data processed by both controllers in a respective portion of the system memory associated with each controller for redundancy;
determining that a first of the controllers has entered a failed state;
storing the metadata in resilient storage in response to the first controller entering the failed state, the resilient storage being different than the respective portion of the system memory associated with a second controller;
wherein storing the metadata in resilient storage includes:
saving snapshots of the metadata in the resilient storage, and
saving changes to the metadata which occur between the snapshots, wherein the changes to the metadata are saved in a log structured array;
in response to the first controller being repaired, updating the first controller with at least some of the information received while the first controller was in the failed state; and
returning the system to the normal operating mode in response to the first controller being updated.

2. The computer-implemented method of claim 1, comprising:
- attaching an external process to the specified system memory location in response to a second of the controllers entering a failed state while the first controller is also in a failed state;
- using the information stored in the specified system memory location to restore the system; and
- returning the system to the normal operating mode in response to the system being restored.

3. The computer-implemented method of claim 2, wherein using the information stored in the specified system memory location to restore the system includes:
- sending the information stored in the specified system memory location to a memory location associated with the external process;
- restarting the system in a recovery mode;
- retrieving the information from the external process;
- loading the metadata into the specified system memory location;
- loading the data into random access memory; and
- playing back the data as input/output operations performed on the system.

4. The computer-implemented method of claim 1, wherein the specified system memory location is in random access memory.

5. The computer-implemented method of claim 4, wherein the data is stored in a write cache in the random access memory.

6. The computer-implemented method of claim 1, wherein the information continues to be sent to the second controller for processing while the first controller is in the failed state, wherein the metadata corresponding to the data is stored in random access memory associated with the second controller while the first controller is in the failed state, wherein snapshots of the metadata in the random access memory associated with the second controller are stored to the resilient storage while the first controller is in the failed state.

7. The computer-implemented method of claim 1, wherein splitting received information between the two controllers includes:
- using one of the controllers to process a first portion of the received information;
- using the other of the controllers to process a second portion of the received information;
- using the one of the controllers to backup the second portion of the information; and
- using the other of the controllers to backup the first portion of information.

8. The computer-implemented method of claim 1, wherein changes to the metadata which occur between the snapshots and which are of a size that is in a predetermined range are blocked.

9. A computer program product comprising a computer readable storage medium having program instructions embodied therewith, wherein the computer readable storage medium is not a transitory signal per se, the program instructions readable and/or executable by a processor to cause the processor to perform a method comprising:
- splitting, by the processor, received information between two controllers of a system in a normal operating mode, wherein the received information includes data, wherein the two controllers store the received information in a specified system memory location, each controller storing metadata corresponding to the data processed by both controllers in a respective portion of the system memory associated with each controller for redundancy;
- determining, by the processor, that a first of the controllers has entered a failed state;
- storing, by the processor, the metadata in resilient storage in response to the first controller entering the failed state, the resilient storage being different than the respective portion of the system memory associated with a second controller;
- wherein storing the metadata in resilient storage includes:
  - saving, by the processor, snapshots of the metadata in the resilient storage, and
  - saving, by the processor, changes to the metadata which occur between the snapshots, wherein the changes to the metadata are saved in a log structured array;
- in response to the first controller being repaired, updating, by the processor, the first controller with at least some of the information received while the first controller was in the failed state; and
- returning, by the processor, the system to the normal operating mode in response to the first controller being updated.

10. The computer program product of claim 9, wherein the program instructions are readable and/or executable by the processor to cause the processor to perform the method comprising:
- attaching, by the processor, an external process to the specified system memory location in response to a second of the controllers entering a failed state while the first controller is also in a failed state;
- using, by the processor, the information stored in the specified system memory location to restore the system; and
- returning, by the processor, the system to the normal operating mode in response to the system being restored.

11. The computer program product of claim 10, wherein using the information stored in the specified system memory location to restore the system includes:
- sending, by the processor, the information stored in the specified system memory location to a memory location associated with the external process;
- restarting, by the processor, the system in a recovery mode;
- retrieving, by the processor, the information from the external process;
- loading, by the processor, the metadata into the specified system memory location;
- loading, by the processor, the data into random access memory; and
- playing, by the processor, back the data as input/output operations performed on the system.

12. The computer program product of claim 9, wherein the specified system memory location is in random access memory.

13. The computer program product of claim 12, wherein the data is stored in a write cache in the random access memory.

14. The computer program product of claim 9, wherein the information continues to be sent to the second controller for processing while the first controller is in the failed state, wherein the metadata corresponding to the data is stored in random access memory associated with the second controller while the first controller is in the failed state, wherein snapshots of the metadata in the random access memory associated with the second controller are stored to the resilient storage while the first controller is in the failed state.

15. The computer program product of claim 9, wherein splitting received information between the two controllers includes:
   using, by the processor, one of the controllers to process a first portion of the received information;
   using, by the processor, the other of the controllers to process a second portion of the received information;
   using, by the processor, the one of the controllers to backup the second portion of the information; and
   using, by the processor, the other of the controllers to backup the first portion of information.

16. The computer program product of claim 9, wherein changes to the metadata which occur between the snapshots and which are of a size that is in a predetermined range are blocked.

17. A system, comprising:
   two controllers;
   a processor; and
   logic integrated with the processor, executable by the processor, or integrated with and executable by the processor, the logic being configured to:
   split, by the processor, received information between the two controllers in a normal operating mode, wherein the received information includes data, wherein the two controllers store the received information in a specified system memory location, each controller storing metadata corresponding to the data processed by both controllers in a respective portion of the system memory associated with each controller for redundancy;
   determine, by the processor, that a first of the controllers has entered a failed state;
   store, by the processor, the metadata in resilient storage in response to the first controller entering the failed state, the resilient storage being different than the respective portion of the system memory associated with a second controller;
   wherein storing the metadata in resilient storage includes:
      saving, by the processor, snapshots of the metadata in the resilient storage, and
      saving, by the processor, changes to the metadata which occur between the snapshots, wherein the changes to the metadata are saved in a log structured array;
   in response to the first controller being repaired, update, by the processor, the first controller with information received while the first controller was in the failed state; and
   return, by the processor, the system to the normal operating mode in response to the first controller being updated.

18. The system of claim 17, wherein the logic is configured to:
   attach, by the processor, an external process to the specified system memory location in response to a second of the controllers entering a failed state while the first controller is also in a failed state;
   using, by the processor, the information stored in the specified system memory location to restore the system; and
   returning, by the processor, the system to the normal operating mode in response to the system being restored.

19. The system of claim 18, wherein using the information stored in the specified system memory location to restore the system includes:
   sending, by the processor, the information stored in the specified system memory location to a memory location associated with the external process;
   restarting, by the processor, the system in a recovery mode;
   retrieving, by the processor, the information from the external process;
   loading, by the processor, the metadata into the specified system memory location;
   loading, by the processor, the data into random access memory; and
   playing, by the processor, back the data as input/output operations performed on the system.

20. The system of claim 17, wherein the specified system memory location is in random access memory, wherein the data is stored in a write cache in the random access memory.

* * * * *